(12) United States Patent
Johnson et al.

(10) Patent No.: US 11,920,500 B2
(45) Date of Patent: Mar. 5, 2024

(54) PASSIVE FLOW MODULATION DEVICE

(71) Applicant: General Electric Company, Schenectady, NY (US)

(72) Inventors: Steven Douglas Johnson, Milford, OH (US); Yu-Liang Lin, Mason, OH (US); Craig Alan Gonyou, Blanchester, OH (US); Scott Alan Schimmels, Miamisburg, OH (US); Jeffrey Douglas Rambo, Mason, OH (US); Brian Gregg Feie, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/461,113

(22) Filed: Aug. 30, 2021

(65) Prior Publication Data
US 2023/0066740 A1 Mar. 2, 2023

(51) Int. Cl.
*F01D 9/06* (2006.01)
*F01D 5/08* (2006.01)

(52) U.S. Cl.
CPC ............. *F01D 9/06* (2013.01); *F01D 5/081* (2013.01); *F05D 2240/128* (2013.01); *F05D 2260/232* (2013.01); *F05D 2260/606* (2013.01)

(58) Field of Classification Search
CPC .......... F01D 9/06; F01D 5/081; F01D 17/085; F01D 17/12; F01D 17/14; F01D 17/141; F01D 17/16; F01D 17/162; F01D 5/082; F05D 2240/128; F05D 2260/232; F05D 2260/606; F05D 2300/50211; F05D 2270/303; F05D 2270/3032
See application file for complete search history.

(56) References Cited

U.S. PATENT DOCUMENTS

| | | | |
|---|---|---|---|
| 2,582,842 A | 1/1952 | Messinger | |
| 3,814,313 A | 6/1974 | Beam, Jr. et al. | |
| 3,895,243 A | 7/1975 | Amend et al. | |
| 3,975,901 A * | 8/1976 | Hallinger | F01D 11/24 415/117 |
| 4,023,731 A | 5/1977 | Patterson | |
| 4,505,124 A | 3/1985 | Mayer | |
| 4,550,573 A | 11/1985 | Rannenberg | |

(Continued)

FOREIGN PATENT DOCUMENTS

| EP | 2003311 A2 | 12/2008 |
|---|---|---|
| EP | 3018304 A1 | 5/2016 |

(Continued)

*Primary Examiner* — Woody A Lee, Jr.
*Assistant Examiner* — Eric A Lange
(74) *Attorney, Agent, or Firm* — Dority & Manning, P.A.

(57) ABSTRACT

A passive flow modulation device for a machine defining an axial direction and a radial direction, the passive flow modulation device including: a first ring with a first coefficient of thermal expansion; a second ring disposed coaxially with the first ring and positioned at least partially inward of the first ring along the radial direction, spaced from the first ring along the axial direction, or both, the first ring, the second ring, or both defining at least in part one or more passages, the second ring with a second coefficient of thermal expansion that is less than the first coefficient of thermal expansion to passively modulate a size of the one or more passages during operation.

12 Claims, 12 Drawing Sheets

(56) References Cited

U.S. PATENT DOCUMENTS

| | | | |
|---|---|---|---|
| 4,613,280 A | 9/1986 | Tate | |
| 4,730,982 A | 3/1988 | Kervistin | |
| 4,773,212 A | 9/1988 | Griffin et al. | |
| 4,805,398 A * | 2/1989 | Jourdain | F01D 5/082 60/806 |
| 5,149,018 A | 9/1992 | Clark | |
| 5,245,821 A | 9/1993 | Thomas, Jr. et al. | |
| 5,316,437 A | 5/1994 | Czachor | |
| 5,341,636 A | 8/1994 | Paul | |
| 5,667,168 A | 9/1997 | Fluegel | |
| 5,722,241 A | 3/1998 | Huber | |
| 5,724,806 A | 3/1998 | Homer | |
| 6,050,079 A * | 4/2000 | Durgin | F02C 7/125 415/115 |
| 6,106,229 A | 8/2000 | Nikkanen et al. | |
| 6,116,852 A | 9/2000 | Pierre et al. | |
| 6,182,435 B1 | 2/2001 | Niggemann et al. | |
| 6,250,097 B1 | 6/2001 | Lui et al. | |
| 6,415,595 B1 | 7/2002 | Wilmot, Jr. et al. | |
| 6,435,454 B1 | 8/2002 | Engelhardt | |
| 6,485,255 B1 | 11/2002 | Care et al. | |
| 6,672,072 B1 | 1/2004 | Giffin, III | |
| 6,701,717 B2 | 3/2004 | Flatman et al. | |
| 7,260,926 B2 | 8/2007 | Sabatino et al. | |
| 7,377,098 B2 | 5/2008 | Walker et al. | |
| 7,395,657 B2 | 7/2008 | Johnson | |
| 7,398,641 B2 | 7/2008 | Stretton et al. | |
| 7,836,680 B2 | 11/2010 | Schwarz et al. | |
| 7,882,704 B2 | 2/2011 | Chen | |
| 7,966,807 B2 | 6/2011 | Norris et al. | |
| 7,987,676 B2 | 8/2011 | Ast et al. | |
| 8,177,884 B2 | 5/2012 | Schmidt et al. | |
| 8,261,528 B2 | 9/2012 | Chillar et al. | |
| 8,499,822 B2 | 8/2013 | Bulin et al. | |
| 8,522,572 B2 | 9/2013 | Coffinberry et al. | |
| 8,561,386 B2 | 10/2013 | Mons | |
| 8,678,753 B2 | 3/2014 | Farrell | |
| 8,684,275 B2 | 4/2014 | Vafai et al. | |
| 8,747,055 B2 | 6/2014 | McCune et al. | |
| 8,757,508 B2 | 6/2014 | Haasz et al. | |
| 8,765,070 B2 | 7/2014 | Norton et al. | |
| 8,789,377 B1 | 7/2014 | Brostmeyer | |
| 8,858,161 B1 | 10/2014 | Ryznic et al. | |
| 8,944,367 B2 | 2/2015 | Bystry, Jr. et al. | |
| 8,978,353 B2 | 3/2015 | Norton et al. | |
| 8,984,884 B2 | 3/2015 | Xu et al. | |
| 9,014,791 B2 | 4/2015 | Held | |
| 9,038,397 B2 | 5/2015 | Papa et al. | |
| 9,120,580 B2 | 9/2015 | Sampath | |
| 9,127,566 B2 | 9/2015 | Suciu et al. | |
| 9,175,566 B2 | 11/2015 | Xu et al. | |
| 9,181,933 B2 | 11/2015 | Daly et al. | |
| 9,188,010 B2 | 11/2015 | Jha et al. | |
| 9,200,855 B2 | 12/2015 | Kington et al. | |
| 9,267,382 B2 | 2/2016 | Szwedowicz et al. | |
| 9,297,310 B2 | 3/2016 | Giri et al. | |
| 9,347,334 B2 | 5/2016 | Joe et al. | |
| 9,410,482 B2 | 8/2016 | Krautheim et al. | |
| 9,458,764 B2 | 10/2016 | Alecu et al. | |
| 9,562,476 B2 * | 2/2017 | Bastnagel | F16K 31/002 |
| 9,567,095 B2 | 2/2017 | McCarthy et al. | |
| 9,580,185 B2 | 2/2017 | Rhoden et al. | |
| 9,593,590 B2 | 3/2017 | Ebert et al. | |
| 9,644,490 B2 | 5/2017 | Joe et al. | |
| 10,113,486 B2 | 10/2018 | Mueller et al. | |
| 10,787,920 B2 | 9/2020 | Day et al. | |
| 10,920,612 B2 | 2/2021 | Lefebvre et al. | |
| 11,434,775 B2 * | 9/2022 | Snyder | F01D 9/065 |
| 2009/0133380 A1 | 5/2009 | Donnerhack | |
| 2009/0188234 A1 | 7/2009 | Suciu et al. | |
| 2010/0212857 A1 | 8/2010 | Bulin et al. | |
| 2010/0313591 A1 | 12/2010 | Lents et al. | |
| 2012/0216502 A1 | 8/2012 | Freund et al. | |
| 2013/0186100 A1 | 7/2013 | Rhoden et al. | |
| 2013/0192238 A1 | 8/2013 | Munsell et al. | |
| 2013/0259687 A1 | 10/2013 | Suciu et al. | |
| 2013/0280028 A1 | 10/2013 | Benjamin et al. | |
| 2014/0165570 A1 | 6/2014 | Herring | |
| 2014/0205446 A1 | 7/2014 | Patsouris et al. | |
| 2014/0345292 A1 | 11/2014 | Diaz et al. | |
| 2014/0360153 A1 | 12/2014 | Papa et al. | |
| 2015/0000291 A1 | 1/2015 | Smith et al. | |
| 2015/0040986 A1 | 2/2015 | Tichborne et al. | |
| 2015/0114611 A1 | 4/2015 | Morris et al. | |
| 2016/0108814 A1 | 4/2016 | Schmitz | |
| 2016/0138478 A1 | 5/2016 | Negulescu | |
| 2016/0215646 A1 | 7/2016 | Gonyou et al. | |
| 2016/0290214 A1 | 10/2016 | Ekanayake et al. | |
| 2016/0341126 A1 | 11/2016 | Kupratis et al. | |
| 2016/0369700 A1 | 12/2016 | Ribarov et al. | |
| 2017/0030266 A1 | 2/2017 | Cerny et al. | |
| 2017/0044984 A1 | 2/2017 | Pesyna et al. | |
| 2017/0114721 A1 | 4/2017 | Miller et al. | |
| 2017/0159566 A1 | 6/2017 | Sennoun et al. | |
| 2017/0167382 A1 | 6/2017 | Miller et al. | |
| 2017/0184027 A1 | 6/2017 | Moniz et al. | |
| 2018/0354637 A1 | 12/2018 | Suciu et al. | |
| 2019/0063313 A1 | 2/2019 | Rez et al. | |
| 2019/0153952 A1 | 5/2019 | Niergarth et al. | |
| 2019/0153953 A1 | 5/2019 | Niergarth et al. | |
| 2019/0218971 A1 | 7/2019 | Niergarth et al. | |
| 2020/0199051 A1 | 6/2020 | Ohhigashi et al. | |

FOREIGN PATENT DOCUMENTS

| | | |
|---|---|---|
| EP | 3075957 A1 | 10/2016 |
| EP | 3130763 A1 | 2/2017 |
| EP | 3784958 A1 | 3/2021 |
| GB | 2034822 A | 6/1980 |
| GB | 2136880 A | 9/1984 |
| GB | 2204361 A | 11/1988 |
| JP | S5932893 U | 2/1984 |
| WO | WO02/16743 A1 | 2/2002 |
| WO | WO02/038938 A1 | 5/2002 |
| WO | WO2006/079438 A1 | 8/2006 |
| WO | WO2011/038188 A1 | 3/2011 |
| WO | WO2015105552 A1 | 7/2015 |

* cited by examiner

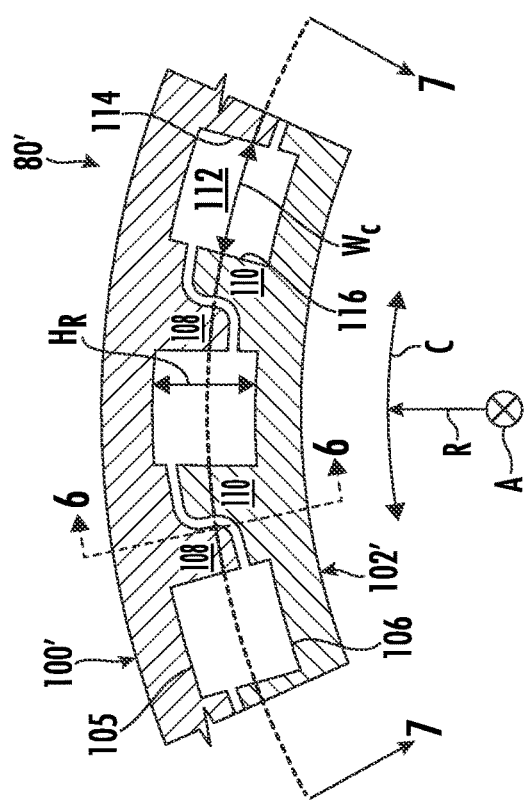
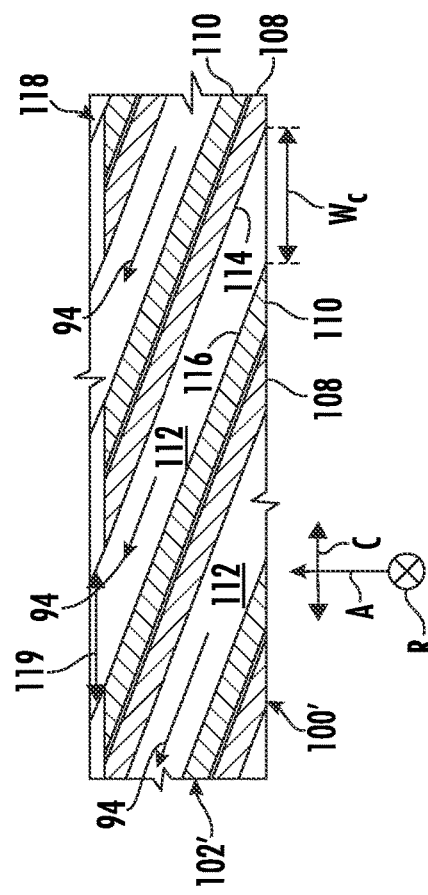
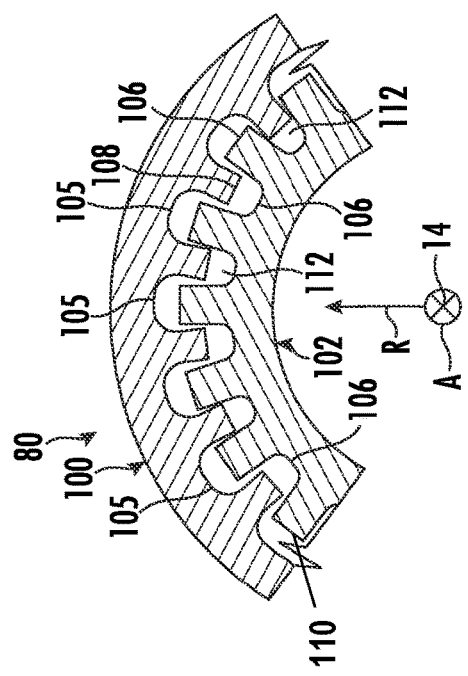
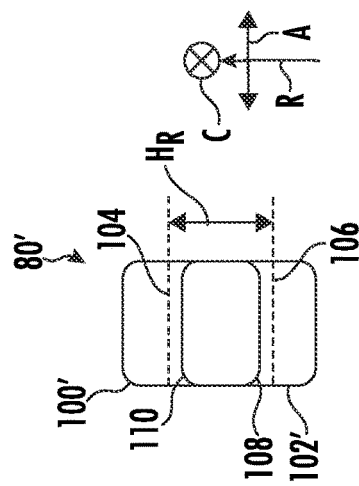

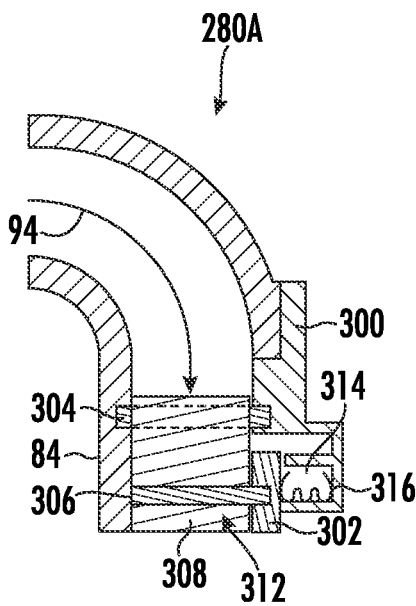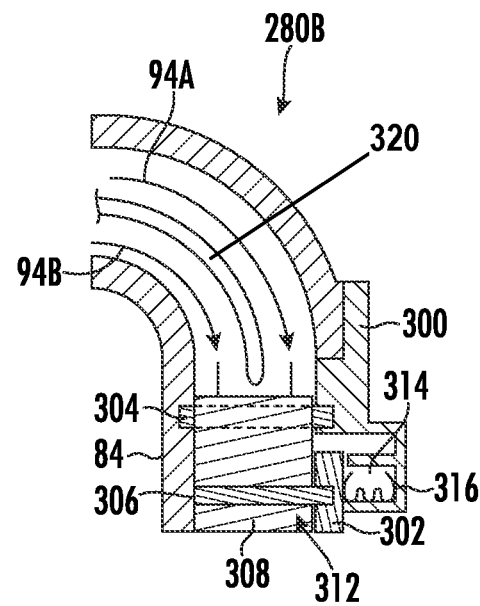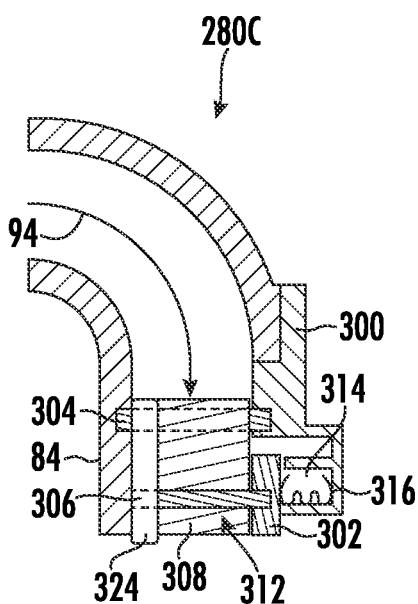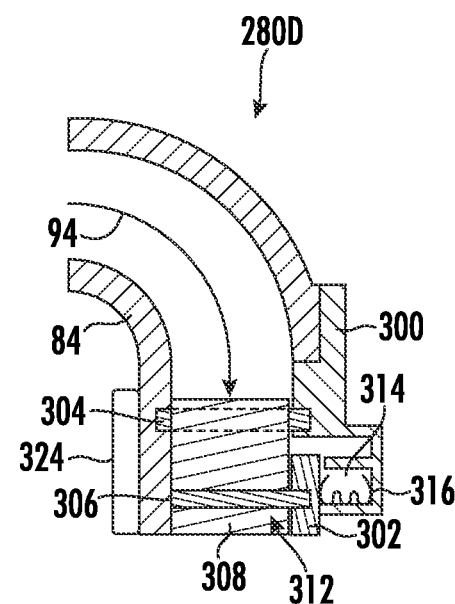

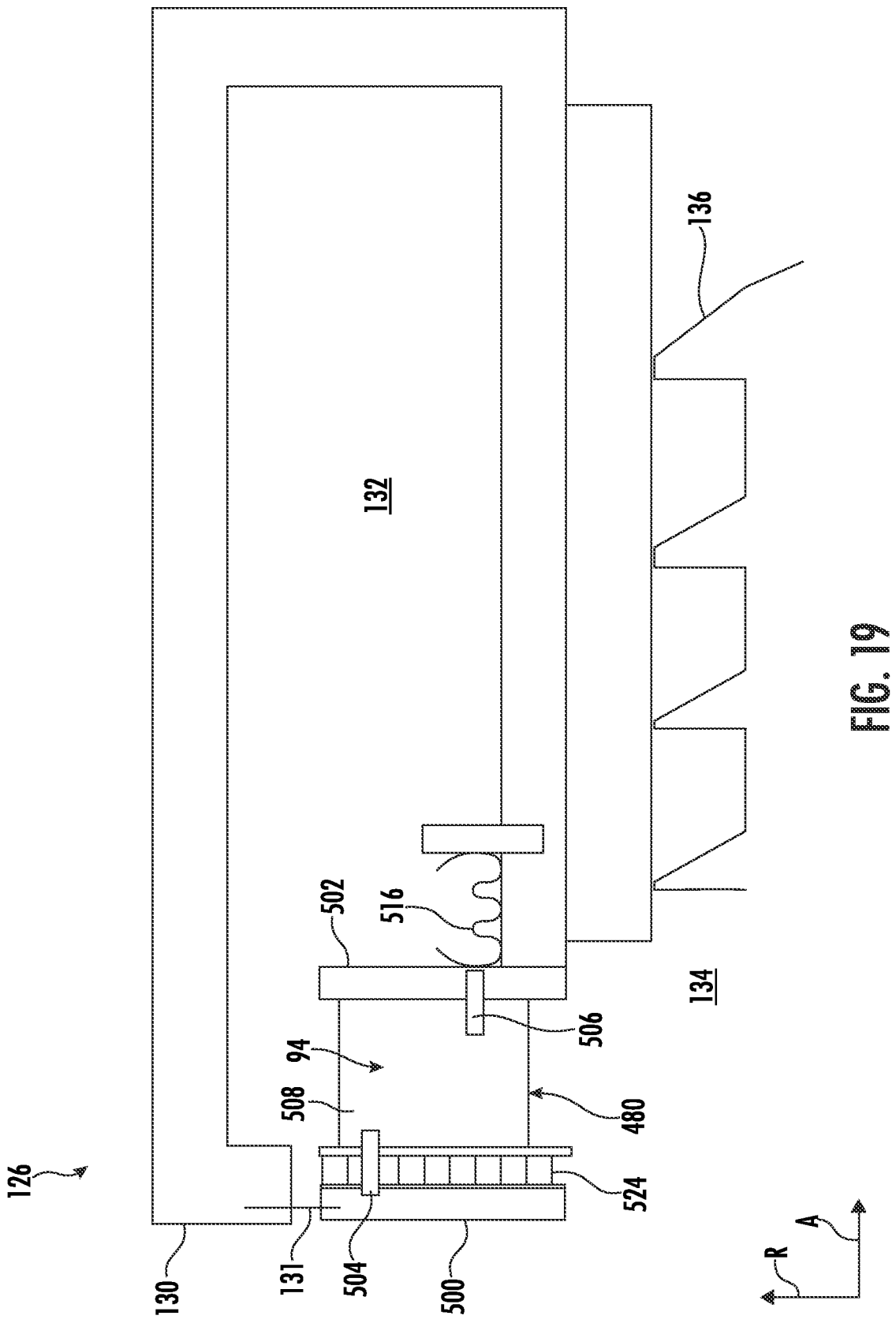

PASSIVE FLOW MODULATION DEVICE

FIELD

In general, the present disclosure relates to a passive flow modulation device, such as an air flow inducer for a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly.

Existing gas turbine engines typically include various fluid management systems for managing air flows used in association with thermal energy management. For example, during operation of the engine, different parts of the engine experience high amounts of thermal energy.

In particular, rotating components such as the high pressure turbine rotor often experience high thermal energy levels during the different operational modes of the engine. Existing cooling systems provide a flow of cooling air to the high pressure turbine rotor in order to provide cooling functionality. The inventors of the present disclosure have found that it may be difficult to maintain desired temperature levels and pressure ratios of the flow of cooling air provided to the high pressure turbine rotor, and thus improvements to address these issues would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 4 is a cross-section view taken along 3-3 in FIG. 3 of the inducer assembly in accordance with an exemplary aspect of the present disclosure.

FIG. 5 is a cross-section view of an alternative inducer assembly in accordance with an exemplary aspect of the present disclosure.

FIG. 6 is an alternative cross-section view taken along 6-6 in FIG. 5 of the alternative inducer assembly in accordance with an exemplary aspect of the present disclosure.

FIG. 7 is a second alternative cross-section view taken along 7-7 in FIG. 5 of the alternative inducer assembly in accordance with an exemplary aspect of the present disclosure.

FIG. 14 is an isolated cross-section view of a first axial inducer assembly in accordance with an exemplary aspect of the present disclosure.

FIG. 15 is an isolated cross-section view of a second axial inducer assembly in accordance with an exemplary aspect of the present disclosure.

FIG. 16 is an isolated cross-section view of a third axial inducer assembly in accordance with an exemplary aspect of the present disclosure.

FIG. 17 is an isolated cross-section view of a fourth axial inducer assembly in accordance with an exemplary aspect of the present disclosure.

FIG. 19 is an isolated cross-section view of the axial inducer assembly of FIG. 18 in accordance with an exemplary aspect of the present disclosure.

DETAILED DESCRIPTION

Figure 1:
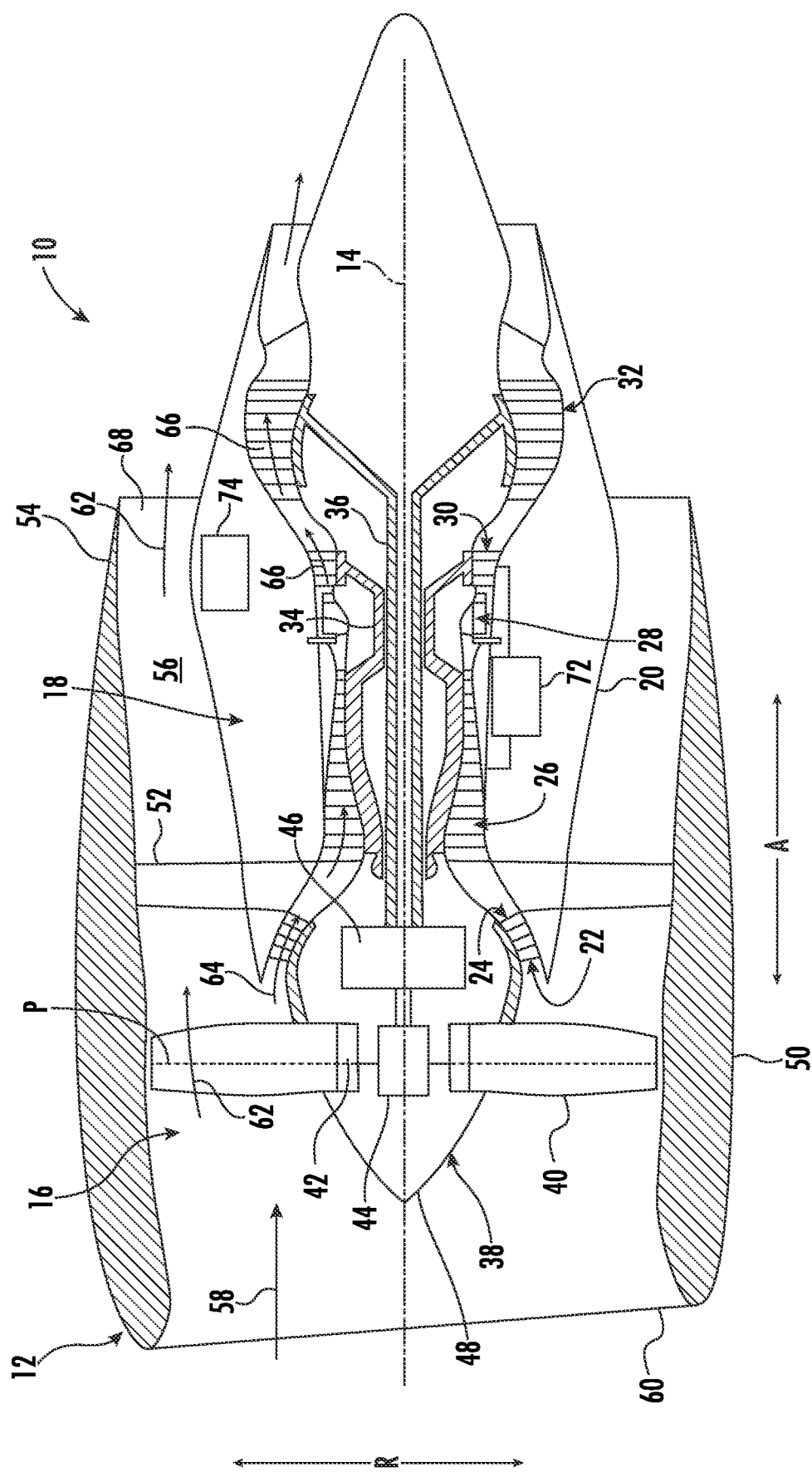
FIG. 1 is a schematic, cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

Aspects of the present disclosure present a method of and assembly for passively modulating a flow of air through an inducer of a gas turbine engine.

In a first embodiment, the disclosure presents a differential variable-area radial inducer that passively modulates a cooling flow to a high pressure turbine, such as to a first stage rotor blade of the high pressure turbine blade. For example, an outer ring with a high coefficient of thermal expansion (e.g., a material such as metal) is assembled with an inner ring with a low coefficient of thermal expansion (e.g., a material such as ceramic matric composite). When assembled, the two rings form discrete, radially-configured airflow passages which act as an inducer for the cooling air flow delivered to the high pressure turbine. During operation, the differential in coefficients of thermal expansion causes the outer ring to grow faster than the inner ring, thus opening up a flow area between the rings in response to an increase in temperature of the airflow passing through the rings.

In a second embodiment, the disclosure presents a differential variable-area radial inducer that passively modulates a cooling flow to a high pressure turbine. In particular, a first sidewall plate with a high coefficient of thermal expansion (e.g., a material such as metal) bounds one side of a group of circumferentially disposed nozzle blades of the inducer, while a second sidewall plate with a low coefficient of thermal expansion (e.g., a material such as a ceramic matrix composite) bounds the other side of the group of nozzle blades. The first sidewall plate with the high coefficient of thermal expansion has a circle of pins each of which connect to a nozzle blade. The second sidewall plate with the low coefficient of thermal expansion has a circle of pins each of which also connect to a nozzle blade. As a temperature of air flow through the two rings increases, the first sidewall plate (with the high coefficient of thermal expansion) radially outgrows the second sidewall plate (with the low coefficient of thermal expansion), thus rotating the nozzle blades open and increasing the throat area of the inducer.

These two passive, temperature-driven inducer configurations reduce an amount of flow through the inducer providing a benefit of maintaining a maximum inducer pressure ratio resulting in an improved specific fuel consumption.

Referring now to the drawings, wherein identical numerals indicate the same elements throughout the figures, FIG. 1 is a schematic, cross-sectional view of a propulsion system 10 in accordance with an exemplary embodiment of the present disclosure. More particularly, for the embodiment of FIG. 1, propulsion system 10 includes a gas turbine engine, referred to herein as "turbofan engine 12." In one example, turbofan engine 12 can be a high-bypass turbofan jet engine. As shown in FIG. 1, turbofan engine 12 defines an axial direction A (extending parallel to an axial centerline 14 provided for reference) and a radial direction R. In general, turbofan engine 12 includes a fan section 16 and a turbomachine 18 disposed downstream from fan section 16.

The exemplary turbomachine 18 depicted generally includes a substantially tubular outer casing 20 that defines an annular inlet 22. Outer casing 20 encases, in serial flow order/relationship, a compressor section including a booster or low pressure compressor 24 ("LP compressor 24") and a high pressure compressor 26 ("HP compressor 26"); a combustion section 28; and a turbine section including a high pressure turbine 30 ("HP turbine 30") and a low pressure turbine 32 ("LP turbine 32"). A high pressure shaft or spool 34 ("HP spool 34") drivingly connects HP turbine 30 to HP compressor 26. A low pressure shaft or spool 36 ("LP spool 36") drivingly connects LP turbine 32 to LP compressor 24.

For the embodiment depicted, fan section 16 includes a variable pitch fan 38 having a plurality of fan blades 40 coupled to a disk 42 in a spaced apart manner. As depicted, fan blades 40 extend outwardly from disk 42 generally along radial direction R. Each fan blade 40 is rotatable relative to disk 42 about a pitch axis P by virtue of fan blades 40 being operatively coupled to a suitable actuation member 44 configured to collectively vary the pitch of fan blades 40, e.g., in unison. Fan blades 40, disk 42, and actuation member 44 are together rotatable about axial centerline 14 by LP spool 36 across a power gear box 46. Power gear box 46 includes a plurality of gears for stepping down the rotational speed of LP spool 36 to a more efficient rotational fan speed.

Referring still to the exemplary embodiment of FIG. 1, disk 42 is covered by a rotatable front hub 48 aerodynamically contoured to promote an airflow through the plurality of fan blades 40. Additionally, fan section 16 includes an annular fan casing or outer nacelle 50 that circumferentially surrounds variable pitch fan 38 and/or at least a portion of turbomachine 18. It should be appreciated that in some embodiments, nacelle 50 is configured to be supported relative to turbomachine 18 by a plurality of circumferentially spaced outlet guide vanes 52. Moreover, a downstream section 54 of nacelle 50 extends over an outer portion of turbomachine 18 so as to define a bypass airflow passage 56 therebetween.

During operation of turbofan engine 12, a volume of air 58 enters turbofan engine 12 through an associated inlet 60 of nacelle 50 and/or fan section 16. As the volume of air 58 passes across fan blades 40, a first portion of air 58 as indicated by arrows 62 is directed or routed into bypass airflow passage 56 and a second portion of air 58 as indicated by arrow 64 is directed or routed into LP compressor 24. The ratio between first portion of air 62 and second portion of air 64 is commonly known as a bypass ratio. The pressure of second portion of air 64 is then increased as second portion of air 64 is routed through high pressure (HP) compressor 26 and into combustion section 28, where second portion of air 64 is mixed with fuel and burned to provide combustion gases 66. Subsequently, combustion gases 66 are routed through HP turbine 30 and LP turbine 32, where a portion of thermal and/or kinetic energy from combustion gases 66 is extracted.

Combustion gases 66 are then routed through combustion section 28 of turbomachine 18 to provide propulsive thrust. Simultaneously, the pressure of first portion of air 62 is substantially increased as first portion of air 62 is routed through bypass airflow passage 56 before first portion of air 62 is exhausted from fan nozzle exhaust section 68 of turbofan engine 12, also providing propulsive thrust.

Moreover, as is depicted schematically, turbofan engine 12 further includes various accessory systems to aid in the operation of turbofan engine 12 and/or an aircraft including turbofan engine 12. For example, as will be discussed in more detail below, turbofan engine 12 includes compressor cooling air ("CCA") system 72 for providing air from one or both of HP compressor 26 or LP compressor 24 to one or both of HP turbine 30 or LP turbine 32. The CCA system 72 may include a duct and a CCA heat exchanger. The duct may receive an airflow from the compressor section and provide such airflow to the CCA heat exchanger to be cooled. The cooled airflow may then be provided to, e.g., the turbine section to cool various components of the turbine section. Moreover, turbofan engine 12 includes active thermal clearance control ("ACC") system 74 for cooling a casing of the turbine section to maintain a clearance between the various turbine rotor blades and the turbine casing within a desired range throughout various engine operating conditions. Although not depicted, the ACC system 74 may similarly include a duct for receiving an airflow and providing such airflow to an ACC heat exchanger.

It should be appreciated, however, that turbofan engine 12 depicted in FIG. 1 is by way of example only, and that in other exemplary embodiments, aspects of the present disclosure may additionally, or alternatively, be applied to any other suitable gas turbine engine. For example, in other exemplary embodiments, turbofan engine 12 may instead be any other suitable aeronautical gas turbine engine, such as a turbojet engine, turboshaft engine, turboprop engine, etc. Additionally, in still other exemplary embodiments, turbofan engine 12 may include any other suitable number and/or configuration of shafts, spools, compressors, turbines, etc.; may be configured as a direct drive engine (e.g., excluding power gear box 46); may be a fixed-pitch fan; may be an unducted turbofan engine (excluding nacelle 50); etc.

Figure 2:
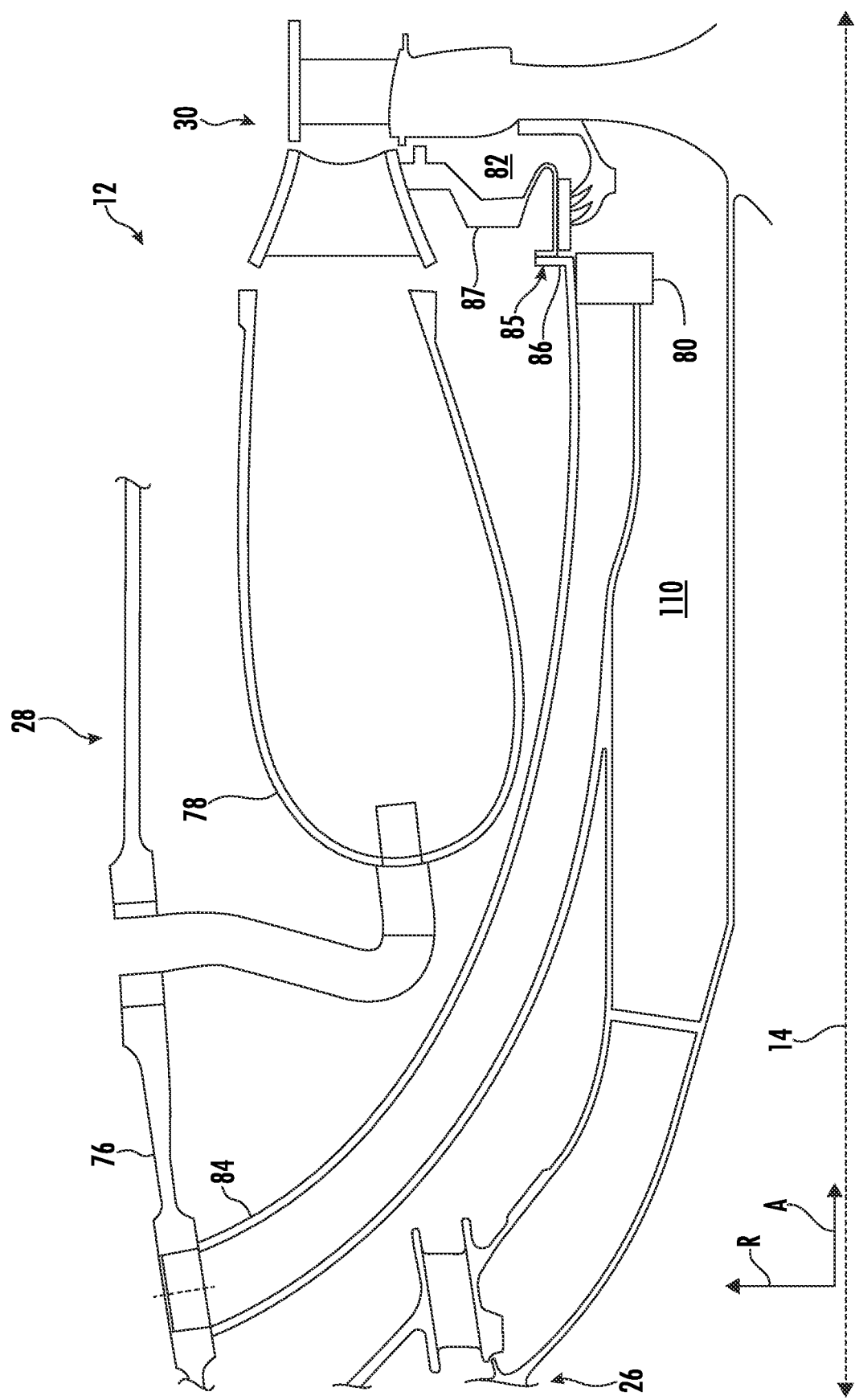
FIG. 2 is an enlarged cross-section view of a portion of the gas turbine engine and shows an inducer assembly in accordance with an exemplary aspect of the present disclosure.

Referring now to FIG. 2, FIG. 2 is an enlarged cross-section view of a portion of turbomachine 18 (see, e.g., FIG. 1) of turbofan engine 12 and shows an inducer assembly in accordance with an exemplary aspect of the present disclosure.

Turbofan engine 12 includes a combustor casing 76. Combustor casing 76 is case or shell of hard material surrounding and defining an exterior surface of combustion section 28.

Turbofan engine 12 also includes a combustor 78. Combustor 78 is a portion of turbomachine 18 defining a cavity in which air from HP compressor and liquid fuel is combusted to produce motive for propulsion system 10 (see, e.g., FIG. 1).

Turbofan engine 12 further includes a passive flow modulation device. More specifically, for the embodiment depicted, the passive flow modulation device is configured as an inducer assembly 80. In certain exemplary embodiments, inducer assembly 80 is configured to turn a flow of cooling air to at least partially match a rotation of a rotor disk of HP turbine 30. The flow of cooling air may then be provided along the rotor disk to first stage turbine blades of HP turbine 30. Inducer assembly 80 is further discussed in detail with respect to the remaining figures.

Turbofan engine 12 additionally includes a forward cavity 82 defined between combustion section 28 and HP turbine 30.

In this exemplary embodiment, turbofan engine 12 includes a duct 84. Duct 84 is a conduit or tube configured to transport a fluid flow therethrough. Turbofan engine 12 also includes a frame assembly 85, the frame assembly 85 including a forward portion or forward frame 86 and an aft portion or aft frame 87. The frame assembly 85 is stationary with respect to the rotating parts within the turbomachine 18. Frame assembly 85 is solid, rigid frame within turbomachine 18. The forward frame 86 is configured as part of the duct 84. In certain exemplary embodiments, the aft frame 87 is part of an inlet guide frame. The forward and aft frames 86, 87 may be joined in any suitable manner. Additionally, or alternatively, in other embodiments, the forward and aft frames 86, 87 may be formed integrally as a single monolithic component.

Figure 3:
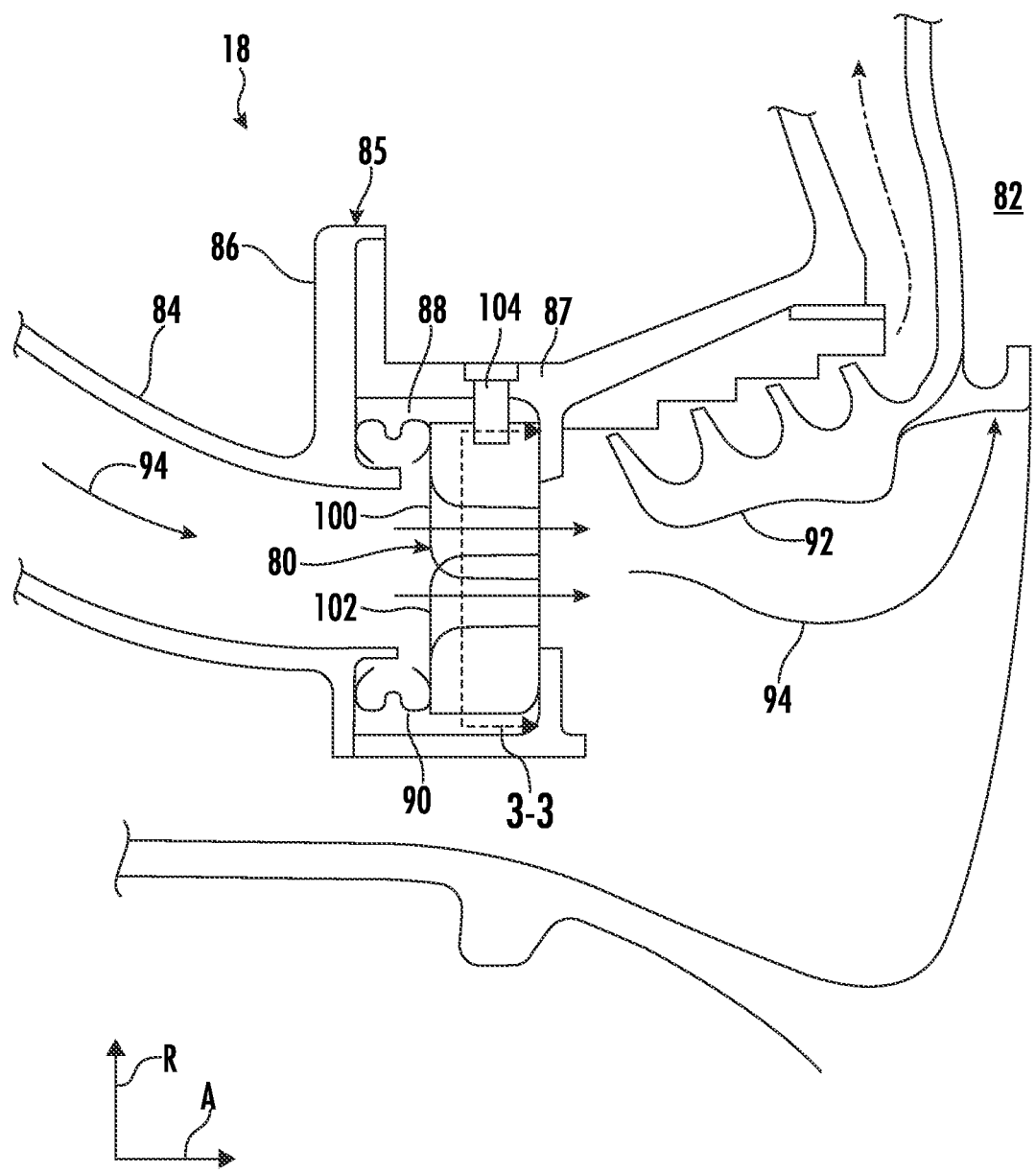
FIG. 3 is a further enlarged cross-section view of a portion of the gas turbine engine and shows the inducer assembly in accordance with an exemplary aspect of the present disclosure.

Referring now to FIG. 3, FIG. 3 is a further enlarged cross-section view of a portion of turbomachine 18 of turbofan engine 12 and shows inducer assembly 80 in accordance with an exemplary aspect of the present disclosure.

Turbofan engine 12 additionally includes a first seal 88, a second seal 90, and a third seal 92. First seal 88 and second seal 90 are fluidic seals configured to prevent or minimize a flow of a fluid thereacross. In certain exemplary embodiments, first seal 88 and second seal 90 may include W-seals. For the embodiment depicted, forward frame 86 includes a first lip to contain first seal 88 and a second lip to contain second seal 90. Third seal 92 is another fluidic seal. In an exemplary embodiment, third seal 92 may include a rotational seal such as a labyrinth seal.

As discussed above with respect to FIG. 2, turbofan engine 12 provides an air flow 94 through duct 84 during operation of the turbofan engine 12. The air flow 94 may be a CCA air flow from CCA system 72.

Inducer assembly 80 includes a first ring 100 and a second ring 102 disposed coaxially with the first ring 100 and spaced from the first ring 100. More specifically, first and second rings 100, 102 are each disposed about axial centerline 14 of turbofan engine 12. First ring 100 of inducer assembly 80 is mounted to the frame assembly, and more specifically to the aft frame 87. First ring 100 is moveably coupled to the frame assembly such that the first ring 100 is moveable along the radial direction R relative to the frame assembly. In particular, for the embodiment shown, first ring 100 is mounted via a plurality of pins 104. In this exemplary embodiment, one pin 104 is shown. It will be appreciated, however, that in other exemplary embodiments, a plurality of pins 104 can be distributed along a circumference of first ring 100. Pins 104 may also be referred to as spoke centering pins. With such a configuration, first seal 88 is configured as a sliding seal configured to form an air flow seal between frame assembly and first ring 100, and more specifically between forward frame 86 and first ring 100, as first ring 100 moves along the radial direction R relative to frame assembly, as will be discussed below.

In certain exemplary embodiments, inducer assembly 80 may be in fluid communication with the compressor section (e.g., LP compressor 24 and HP compressor 26) via duct 84 and with HP turbine 30 (see, e.g., FIG. 1) via forward cavity 82. For example, turbofan engine 12 may include a source of cooling air in fluid communication with inducer assembly 80 and inducer assembly 80 may configured to supply a flow of cooling air to HP turbine 30 (see, e.g., FIG. 1) of turbomachine 18.

First ring 100 and second ring 102 are, e.g., tubular rings of solid material. In certain exemplary embodiments, first ring 100 includes a material with a first coefficient of thermal expansion. More specifically, in at least certain exemplary aspects, a material of first ring 100 may include a metal such as a nickel or nickel alloy. Additionally, or alternatively, the first coefficient of thermal expansion can be 5 microinches/(inch×deg. Fahrenheit) or greater (such as greater than or equal to 7 microinches/(inch×deg. Fahrenheit), such as less than or equal to 13 microinches/(inch×deg. Fahrenheit)).

Likewise, second ring 102 may include a material with a second coefficient of thermal expansion that is different than the first coefficient of thermal expansion. In certain exemplary embodiments, the second coefficient of thermal expansion of second ring 102 is less than the first coefficient of thermal expansion of first ring 100. More specifically, in at least certain exemplary aspects, a material of second ring 102 may include a non-metal material such as a ceramic matrix composite, such as a silicon carbide material. Additionally, or alternatively, the second coefficient of thermal expansion can be 5 microinches/(inch×deg. Fahrenheit) or less (such as less than or equal to 4 microinches/(inch×deg. Fahrenheit), such as less than or equal to 3 microinches/(inch×deg. Fahrenheit), such as greater than 0 microinches/(inch×deg. Fahrenheit)).

As will be discussed further with respect to FIGS. 4-8, first ring 100 is configured to expand at a first rate in response to a change in thermal energy. Second ring 102 is configured to expand at a second rate in response to the same change in thermal energy. More specifically, in at least certain exemplary aspects, the first rate of first ring 100 is greater than the second rate of second ring 102.

In certain exemplary embodiments, if air flow 94 includes only a flow of air from a cooled cooling air source (e.g., a cooled cooling air heat exchanger of CCA system 72), inducer assembly 80 can function as a safety mechanism to open or increase a flow area of inducer assembly 80 in the event that CCA system 72 fails to deliver an intended amount of cooling (e.g., if the CCA heat exchanger is not receiving a desired amount of cooling as a result of a broken pipe or the like) resulting in a higher temperature air being delivered to inducer assembly 80. In such an instance where CCA system 72 fails to deliver the intended amount of cooling to inducer assembly 80, the flow area of inducer assembly 80 is increased (in response to air flow 94 having a higher temperature) and more cooling air may be delivered to HP turbine 30 to protect HP turbine 30.

Referring now to FIG. 4, FIG. 4 is a cross-section view of inducer assembly 80 taken along 3-3 in FIG. 3 in accordance with an exemplary aspect of the present disclosure. For example, the cross-section view provided in FIG. 4 is from a forward looking aft viewpoint of inducer assembly 80 relative to a forward direction (e.g., to the left as shown in FIG. 3) and a rearward direction (e.g., to the right as shown in FIG. 3) of turbofan engine 12. In FIG. 4, axial direction A and axial centerline 14 are shown as into the page and radial direction R is shown as pointing in an upward direction (e.g., pointing away from axial centerline 14).

In this exemplary embodiment, second ring 102 is disposed inside of first ring 100 along radial direction R. First ring 100 and second ring 102 may be concentric with each other. First ring 100 and/or second ring 102 may be disposed coaxially with each other and/or with axial centerline 14 of turbofan engine 12.

First ring 100 defines an inner surface 105. Inner surface 105 is an inner surface along radial direction R of first ring 100. Second ring defines an outer surface 106. Outer surface 106 is an outer surface along radial direction R of second ring 102. First ring 100 includes a first threading 108 that is disposed along inner surface 105 along radial direction R of first ring 100. Second ring 102 includes a second threading 110 that is disposed along outer surface 106 along radial direction R of second ring 102. First threading 108 of first ring 100 is threadably engaged with the second threading of second ring 102.

In certain exemplary embodiments, inducer assembly 80 defines one or more of passages 112. More specifically, in at least certain exemplary aspects, second ring 102 is spaced from first ring 100 to define the one or more passages 112 therebetween. In particular, for the embodiment shown, the one or more passages 112 include a plurality of passages 112 defined between the first ring 100 and second ring 102. For example, each of passages 112 can be defined in-part by a radially facing end-face of one of second threading 110, in-part by a discrete portion of inner surface 105, and further in-part by side-walls of adjacent pieces or teeth of first threading 108. In the embodiment shown in FIG. 4, less-than full circumferential portions of first ring 100 and second ring 102 are shown. It should be appreciated, however, that first ring 100 and second ring 102 of inducer assembly 80 extend a full circumference to form continuous, full 360° rings. It should be appreciated that the plurality of passages 112 together may define and be referred to as a flow passage.

In certain exemplary embodiments, the plurality of passages 112 of inducer assembly 80 is configured to direct air flow 94 (see e.g., FIG. 3) through passages 112 in axial direction A. More specifically, although not explicitly depicted in FIG. 4, it will be appreciated that the first and second threadings 108, 110 define a helical shape along the axial direction A. In such a manner, the first and second rings 100, 102 of the inducer assembly 80, and the plurality of passages 112 defined therebetween, may function to turn the air flow 94 to introduce a circumferential direction to the air flow 94 so as to facilitate the air flow 94 being provided to rotating parts of the turbofan engine 12, such as the HP turbine rotor blade.

Passages 112 together define a flow area through which air flow 94 (see e.g., FIG. 3) passes through as air flow 94 makes its way through inducer assembly 80 and on to forward cavity 82. As air flow 94 passes through passages 112 of inducer assembly 80, thermal energy is transferred between air flow 94 and first ring 100 and between air flow 94 and second ring 102.

Due to the mismatch in coefficients of thermal expansion between first ring 100 and second ring 102, first ring 100 and second ring 102 expand or contract at different rates in response to the change in and transfer of thermal energy. As the first ring 100 and second ring 102 expand or contract at different rates, sizes of passages 112 increase or decrease, respectively, thereby changing the flow area of passages 112 that air flow 94 is able to flow through. As the flow area of passages 112 increases or decreases, an amount of air flow 94 is modulated thereby changing an amount of air flow 94 eventually delivered to HP turbine 30 (e.g., via forward cavity 82, see e.g., FIG. 3).

Operation of the inducer assembly 80 will be described below. As will be appreciated from the above description and the description below, inducer assembly 80 is configured as a thermally driven flow-metering device and/or a differential variable-area axial inducer that passively modulates air flow 94 (e.g., a cooling flow) to a turbine rotor (e.g., a first stage rotor blade of HP turbine 30). The disclosed configuration of inducer assembly 80 may provide benefits of reducing pressure losses throughout turbomachine 18 and reducing an amount of cooling air (e.g., air flow 94) needed to sufficiently cool the rotor blade of HP turbine 30 during the varying modes of operation (e.g., taxi, take-off, cruise, etc.) of an aircraft incorporating propulsion system 10.

Referring now to FIG. 5, wherein numerals identical to those discussed with respect to FIG. 4 indicate the same or similar elements, FIG. 5 is a cross-section view of an alternative inducer assembly in accordance with an exemplary aspect of the present disclosure. In particular, FIG. 5 shows an inducer assembly 80' with first ring 100' and second ring 102'. Referring also to FIG. 6, FIG. 6 is an alternative cross-section view taken along 6-6 in FIG. 5 of inducer assembly 80' in accordance with an exemplary aspect of the present disclosure. As presented herein, FIG. 6 is discussed in tandem with FIG. 5.

In FIG. 5, axial direction A is shown as into and out of the page, radial direction R is shown as pointing in an upward direction, and circumferential direction C is shown as curving side-to-side. In FIG. 6, circumferential direction C is shown as into and out of the page, radial direction R is shown as pointing in an upward direction, and axial direction A is shown as side-to-side.

In this exemplary embodiment, inducer assembly 80' includes first ring 100' and second ring 102' that have a different configuration than first ring 100 and second ring 102 shown in FIG. 4. First ring 100' also includes inner surface 105 and first threading 108. Likewise, second ring 102' includes outer surface 106 and second threading 110.

In certain exemplary embodiments, first threading 108 and second threading 110 may include a stepped shaped/configuration along this direction of cross sectional cut. More specifically, in at least certain exemplary aspects, first threading 108 and second threading 110 may each include two steps that engage with the corresponding two steps of the second threading 110 and first threading, respectively.

Here in FIG. 5, passages 112 are defined by first threading 108 and second threading 110 and are disposed between adjacent pairs of first and second threading 108, 110 along circumferential direction C of inducer assembly 80'. Passages 112 of inducer assembly 80' are formed differently than passages 112 of inducer 80 shown in FIG. 4. In FIG. 4 for example, passages 112 of inducer 80 are primarily defined either between a radial end-face of first threading 108 and outer surface 106 of second ring 102 or between a radial end-face of second threading 110 and inner surface 105 of first ring 100 (see e.g., FIG. 4).

Referring back to inducer assembly 80' of FIG. 5, in certain exemplary embodiments, the plurality of passages (e.g., all of passages 112 extending around 360° of inducer assembly 80') can define a flow area of inducer assembly 80'. Additionally, or alternatively, the flow area of inducer assembly 80' may also include any spaces or gaps defined between steps of first threading 108 and of second threading 110 along radial direction R (and along circumferential direction C). In certain exemplary embodiments, the plurality of passages 112 of inducer assembly 80' is configured to direct air flow 94 through passages 112 in axial direction A, and is further configured to introduce a circumferential direction to the air flow 94 (see e.g., FIG. 3) through so as to facilitate the air flow 94 being provided to rotating parts of the turbofan engine 12, such as the HP turbine rotor blade (see FIG. 6, below).

Each of passages 112 define a dimension $H_R$ and a dimension $W_C$. Dimension $H_R$ is a height of one of passages 112 and is defined by a distance from inner surface 105 to outer surface 106 along radial direction R.

In an exemplary embodiment, dimension $W_C$ is a width of one of passages 112 and can be defined by the arc distance between a side-face 114 of first threading 108 to a side-face 116 of a second threading 110 that is adjacent to first threading 108 from which dimension $W_C$ extends/begins. It will be appreciated, however, that in other exemplary embodiments, dimension $W_C$ can be defined as a linear distance along a direction that is perpendicular to radial direction R (e.g., along a secant line intersecting side-face 114 of first threading 108 at a mid-point of side-face 114 and side-face 116 of second threading 110 at a mid-point of side-face 116) between side-face 114 of first threading 108 to side-face 116 of a second threading 110 that is adjacent to first threading 108 from which dimension $W_C$ extends/begins.

In certain exemplary embodiments, the plurality of passages (e.g., all of passages 112 extending around 360° of inducer assembly 80') can define a flow area of inducer assembly 80'. Additionally, or alternatively, the flow area of inducer assembly 80' may also include any spaces or gaps defined between steps of first threading 108 and of second threading 110 along radial direction R (and along circumferential direction C).

Similar to the embodiment described with respect to FIG. 4 above, first ring 100' and second ring 102' of inducer assembly 80' have different coefficients of thermal expansion and therefor have different growth rates in response to the same thermal energy being transferred into or away from first ring 100' and second ring 102'. In certain exemplary embodiments, with the coefficient of thermal expansion of first ring 100' being greater than the coefficient of thermal expansion of second ring 102', first ring 100' grows/expands (and contracts/shrinks) at a faster rate than second ring 102'. Due to this thermal mismatch between the material of first ring 100' and second ring 102', as first ring 100' and second ring 102' absorb thermal energy, the flow area of inducer assembly 80' increases as first ring '100 moves away from along radial direction R from second ring 102'. More specifically, in at least certain exemplary aspects, dimension $H_R$ increases as first ring 100' and second ring 102' absorb thermal energy. Additionally, or alternatively, dimension $W_C$ increases as first ring 100' and second ring 102' absorb thermal energy. In another exemplary embodiment, any spaces or gaps defined between steps of first threading 108 and of second threading 110 along radial direction R (and along circumferential direction C) may also increase in size as first ring 100' and second ring 102' absorb thermal energy.

It should be appreciated in certain exemplary embodiments, that as thermal energy is transferred away from first ring 100' and from second ring 102' (e.g., transferred to air flow 94 passing through inducer assembly 80'), first ring '100 contracts along radial direction R and becomes closer to second ring 102'. As first ring 100' and second ring 102' contract (with first ring 100' contracting at a faster rate due to the mismatch in coefficients of thermal expansion), the sizes of passages 112 decreases thereby causing the flow area of inducer assembly 80' to also decrease. More specifically, in at least certain exemplary aspects, dimension $H_R$ decreases as first ring 100' and second ring 102' transfer away thermal energy. Additionally, or alternatively, dimension We decreases as first ring 100' and second ring 102' transfer away thermal energy. In another exemplary embodiment, any spaces or gaps defined between steps of first threading 108 and of second threading 110 along radial direction R (and along circumferential direction C) may also decrease in size as first ring 100' and second ring 102' transfer away thermal energy.

In this way, as a temperature of air flow 94 passing through inducer assembly 80' and that is delivered to the rotor blade of HP turbine 30 increases, the flow area of inducer assembly 80' increases so as to provide an increased amount of air flow 94 to HP turbine 30 for cooling purposes. Conversely, as the temperature of air flow 94 passing through inducer assembly 80' and that is delivered to the rotor blade of HP turbine 30 decreases, the flow area of inducer assembly 80' decreases so as to provide a decreased amount of air flow 94 to HP turbine 30 for cooling purposes.

By way of example, in certain exemplary embodiments, during a first operating condition (e.g., a low power operating condition), air flow 94 may define a relatively low temperature as the source of air (e.g., a stage of a compressor) may provide relatively low temperature air as a starting point. With such a configuration, the plurality of passages 112 may define a relatively small size. During a second operating condition (e.g., a high power operating condition), air flow 94 may define a relatively high temperature as the source of air may provide a relatively high temperature air as a starting point. This increase in temperature of air flow 94 may cause first ring 100 to expand relative to second ring 102, thereby increasing a size of passages 112 and allowing more air flow 94 to cool HP turbine 30 (which are generally hotter and in need of more cooling at the high power operating condition as compared to the low power operating condition).

Further, during a third operating condition (e.g., a failure condition whereby air flow 94 is not properly cooled), air flow 94 may define an even higher temperature as compared to the first and second operating conditions. This further increase in temperature of air flow 94 may cause first ring 100 to expand further relative to second ring 102, thereby increasing the size of passages 112 even further and allowing even more air flow 94 to cool HP turbine 30. Although in this third operating condition air flow 94 is hotter, the increase in volume permitted through passages 112 may offset the reduction in cooling provided by virtue of the higher temperature until the failure condition may be remedied.

As provided herein, the passive and thermally driven flow metering device that is inducer assembly 80' can eliminate the need for actuators, valves, or pipes (e.g., associated with active flow control systems) thereby providing a weight reduction benefit and an improvement of combustor functionality. Additionally, the proposed axial and passively controlled configuration of inducer assembly 80' (and of inducer assembly 80) provides the benefits of maintaining a maximum pressure ratio at inducer assembly 80' and more generally an improved specific fuel consumption of propulsion system 10.

Referring now to FIG. 7, FIG. 7 is a cross-section view taken along 7-7 in FIG. 5 of inducer assembly 80' in accordance with an exemplary aspect of the present disclosure. Here in FIG. 7, radial direction R is shown as into and out of the page, axial direction A is shown as pointing in an upward direction, and circumferential direction C is shown as side-to-side.

In certain exemplary embodiments, first threading 108 and second threading 110 may be tangentially angled relative to axial direction A and to circumferential direction C, defining a helical shape. As a result, first threading 108 of first ring 100' and second threading 110 of second ring 102' may form or define passages 112 that are also tangentially-angled, defining a helical shape. Such a tangentially-angled configuration of passages 112 enables passages 112 to induce a tangentially angled flow into air flow 94 as air flow 94 passes through inducer assembly 80'.

Additionally, or alternatively, inducer assembly 80' may also include a backer plate 118. Backer plate 118 is a disc of solid material that includes circumferentially spaced slots 119. In this exemplary embodiment, backer plate 118 is disposed at a downstream (e.g., towards the top as shown in FIG. 7) end of first ring 100' and second ring 102'.

In certain exemplary embodiments, backer plate 118 may be disposed to block a selected portion or all of air flow 94 flowing through passages 112. For example, air flow 94 may have a low amount of momentum given a particular pressure or velocity of air flow 94, in which case it may be desirable to minimize a loss of pressure of air flow 94 as air flow 94 passes across inducer assembly 80'. During operation, a position (e.g., rotation, circumferential etc.) of backer plate 118 can be adjusted in order to cover more of passages 112 in order to block more of air flow 94 passing out of passages 112. In this way, air flow 94 can be forced to divert to the smaller openings created by backer plate 118 or through other passages 112 that are not covered or blocked by backer plate 118. As a result, backer plate 118 can reduce low-momentum leakage through inducer assembly 80' and provide improved control of the flow area of passages 112.

Figure 8:
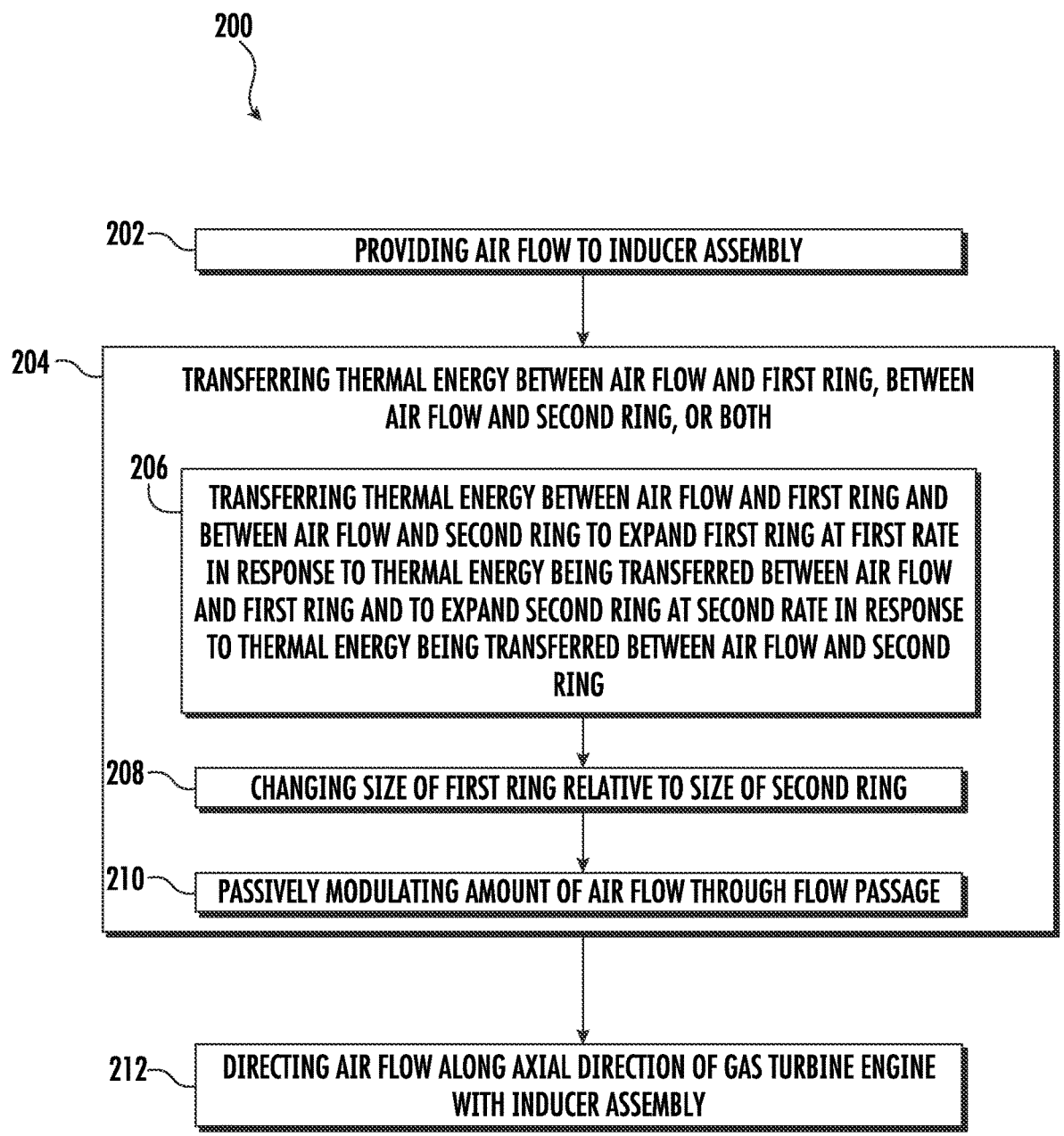
FIG. 8 is a flowchart of a method of modulating a flow of cooling air through the inducer assembly in accordance with an exemplary aspect of the present disclosure.

Referring now to FIG. 8, FIG. 8 is a flowchart of a method 200 of modulating a flow of cooling air (e.g., air flow 94) through a passive flow modulation device, such as through an inducer assembly (e.g., inducer assembly 80 and/or inducer assembly 80') in accordance with an exemplary aspect of the present disclosure. In certain exemplary embodiments, method 200 includes a method of providing airflow in turbofan engine 12. As discusses herein, inducer assembly 80 and its corresponding components are discussed with respect to method 200. It should be appreciated, however, that method 200 depicted in FIG. 8 is by way of example only, and that in other exemplary embodiments, method 200 may also involve inducer assembly 80' and its corresponding components (e.g., first ring 100' and second ring 102', etc.).

Method 200 provides at 202 providing air flow 94 to inducer assembly 80. Method 200 provides at 204 transferring thermal energy between air flow 94 and first ring 100, between air flow 94 and second ring 102, or both.

In an exemplary embodiment, step 204 of method 200 may provide at step 206 transferring thermal energy between air flow 94 and first ring 100 and between air flow 94 and second ring 102 to expand first ring 100 at a first rate in response to thermal energy being transferred between air flow 94 and first ring 100 and to expand second ring 102 at a second rate in response to thermal energy being transferred between air flow 94 and second ring 102. More specifically, in at least certain exemplary aspects, the first rate of first ring 100 is greater than the second rate of second ring 102.

In another exemplary embodiment, step 204 of method 200 may provide at step 208 changing a size of first ring 100 relative to a size of second ring 102. In another exemplary embodiment, step 204 of method 200 may provide at step 210 passively modulating an amount of air flow 94 through passage 112.

Method 200 provides at 212 directing air flow 94 with inducer assembly 80 along axial direction A of turbofan engine 12.

Figure 9:
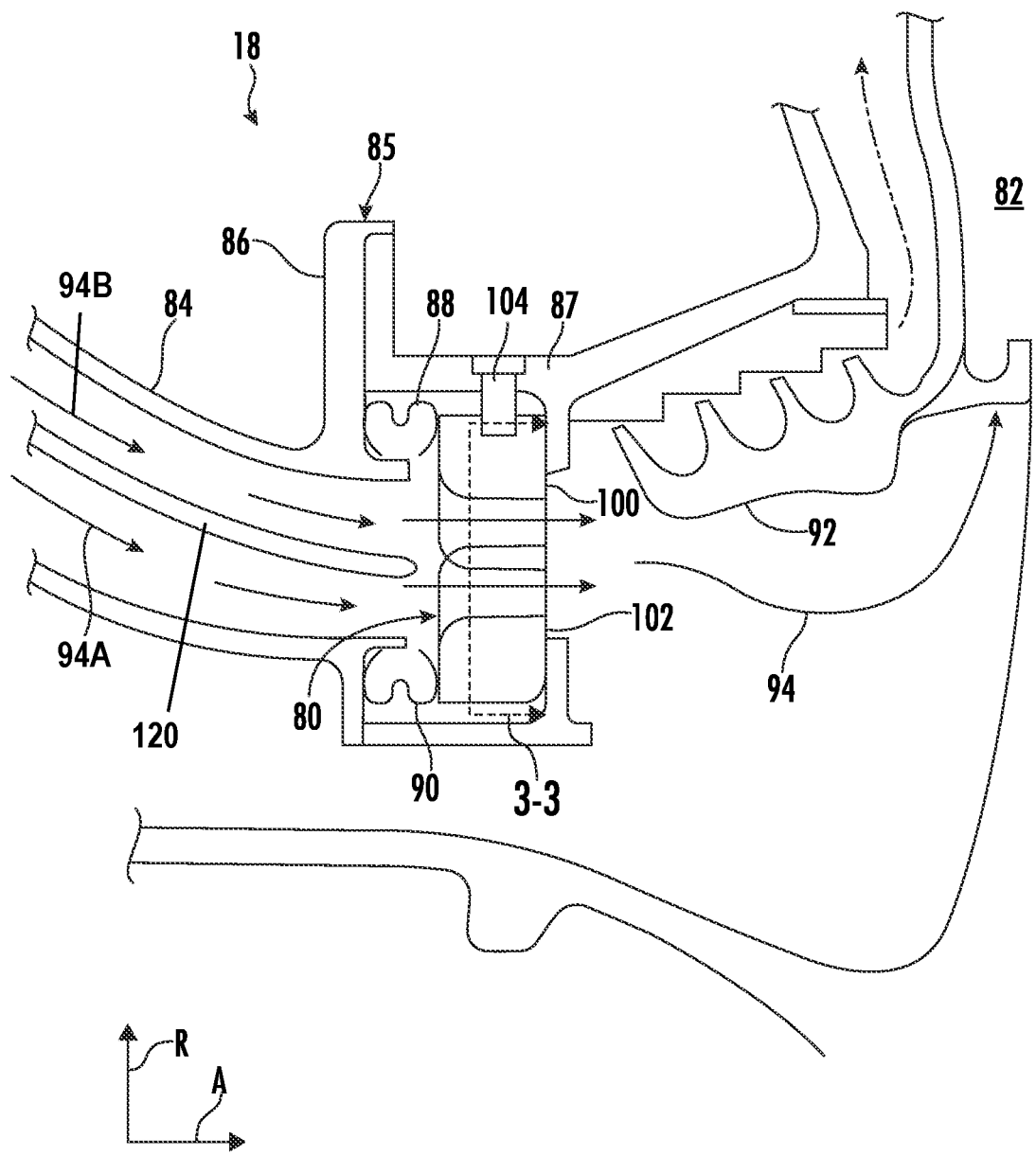
FIG. 9 is an enlarged cross-section view of a portion of the gas turbine engine and shows an alternative inducer assembly in accordance with an exemplary aspect of the present disclosure.

Referring now to FIG. 9, FIG. 9 is an enlarged cross-section view of a portion of turbofan engine 12 (see, e.g., FIG. 2) and shows a flow divider 120 upstream from inducer assembly 80 in accordance with an exemplary aspect of the present disclosure. The embodiment provided in FIG. 9 may be configured in substantially the same manner as described in regard to FIG. 3, with the addition of flow divider 120.

Flow divider 120 is a curved piece of solid material. In certain exemplary embodiments, flow divider 120 can extend partially or a full 360° about axial centerline 14 (see e.g., FIG. 1). Flow divider 120 is disposed in duct 84 and may be mounted to either duct 84 or to a portion of frame assembly 85.

In certain exemplary embodiments, flow divider 120 is disposed to create a temperature profile upstream of inducer assembly 80. More specifically, in at least certain exemplary aspects, flow divider 120 is disposed to separate or prevent (substantial) mixing of a first air flow 94A and a second air flow 94B before first air flow 94A and second air flow 94B reach first ring 100 and second ring 102.

In certain exemplary embodiments, first air flow 94A may include air from the compressor section of turbofan engine 12 (or more particularly, air from a diffuser cavity (see FIG. 3)) while second air flow 94B may include air from a heat exchanger such as from CCA system 72 (see e.g., FIG. 1).

First air flow 94A defines a first temperature and second air flow 94B defines a second temperature. During certain operational modes of propulsion system 10, the first temperature of first air flow 94A may be higher than the second temperature of second air flow 94B. Likewise, a differential between the first temperature of first air flow 94A and the second temperature of second air flow 94B can be at different magnitudes and different rates of change during the different operational modes, and during the transitions therebetween, of propulsion system 10.

In an exemplary embodiment, with first air flow 94A including a higher temperature than second air flow 94B, flow divider 120 would guide the higher temperature first air flow 94A to and across first ring 100 and flow divider would guide the lower temperature second air flow 94B to and across second ring 102. Put another way, the hotter first air flow 94A would preferentially come into contact with first ring 100 while the cooler second air flow 94B would preferentially come into contact with second ring 102.

In this way, the growth rate differential between first ring 100 and second ring 102 would be amplified in that first ring 100 already has a higher coefficient of thermal expansion than second ring 102 and so first ring 100 already grows at a faster rate than second ring 102 when exposed to the same amount of thermal energy transfer. Here, with first ring 100 being exposed to a higher temperature air flow (e.g., first air flow 94A), first ring 100 will grow at a faster rate than second ring 102 due to both the higher amount of thermal energy being transfer to first ring 100 and the larger coefficient of thermal expansion and the corresponding faster thermal growth rate of first ring 100 over second ring 102.

Figure 10:
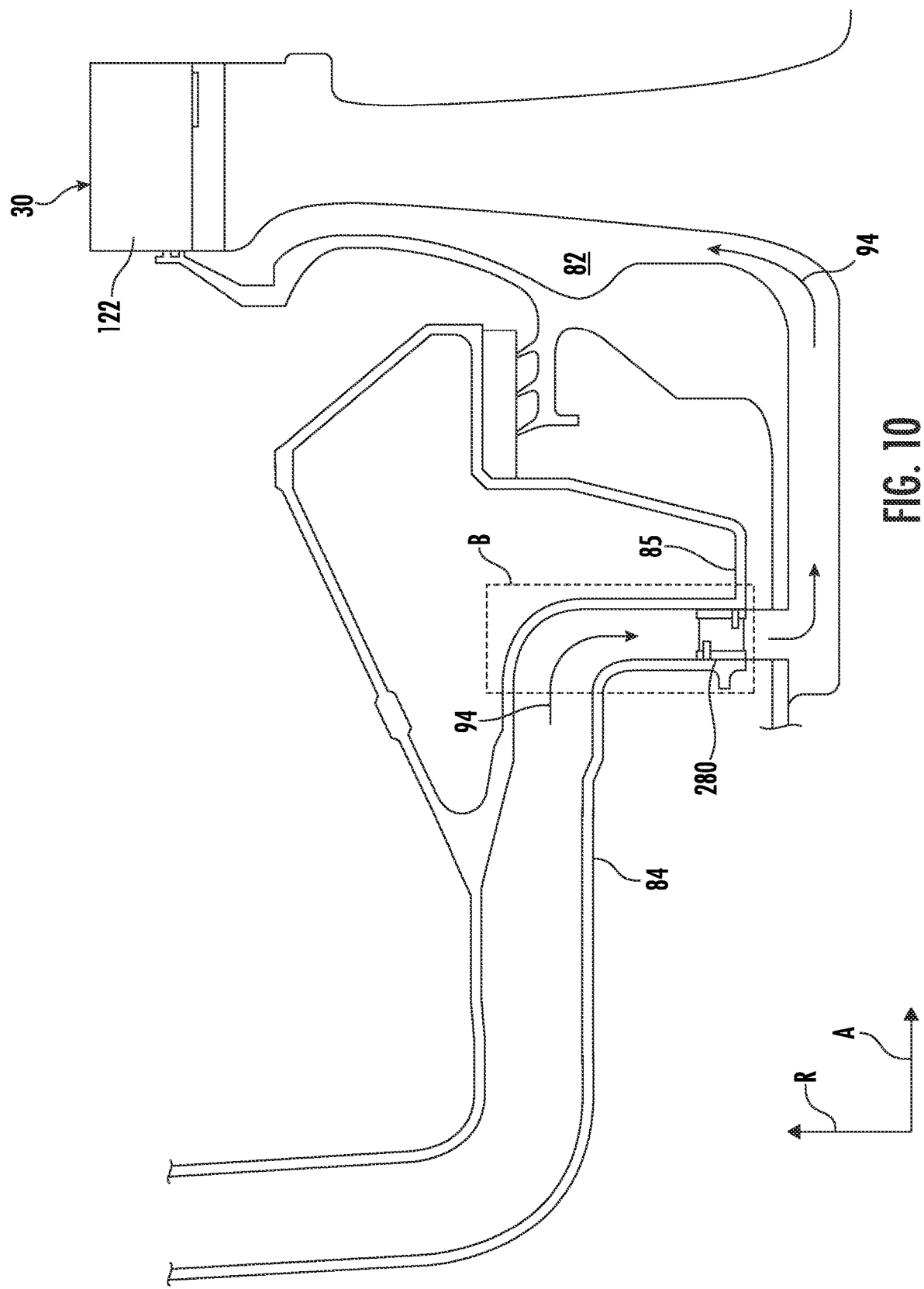
FIG. 10 is an enlarged cross-section view of a portion of the gas turbine engine and shows an axial inducer assembly in accordance with an exemplary aspect of the present disclosure.

Referring now to FIG. 10, FIG. 10 is an enlarged cross-section view of a portion of turbofan engine 12 (see e.g., FIG. 2) and shows an inducer assembly in accordance with an exemplary aspect of the present disclosure. The embodiment provided in FIG. 10 may be configured in substantially the same manner as described in regard to FIG. 3. For example in the embodiment depicted, turbofan engine 12 includes a passive flow modulation device, which more specifically is configured as an inducer assembly 280. However, by contrast to inducer assembly 80 of FIGS. 1 through 9, which is configured generally as an axial inducer assembly, the exemplary inducer assembly 280 of FIG. 10 is configured generally as a radial inducer assembly.

For example, HP turbine 30 includes rotor blade 122. In an exemplary embodiment, rotor blade 122 is in fluid communication with inducer assembly 280 via forward cavity 82. Rotor blade 122 is disposed to rotate about axial centerline 14 (see e.g., FIG. 1) of turbofan engine 12. Additionally, inducer assembly 280 is disposed to deliver air flow 94 to rotor blade 122 of HP turbine 30. More specifically, in at least certain exemplary aspects, inducer assembly 280 is configured to direct air flow 94 through inducer assembly 280 along radial direction R while imparting a circumferential swirl to air flow 94 to at least partially match a rotation of rotor blade 122.

As will be discussed in further detail with respect to FIGS. 11-19, inducer assembly 280 includes a plurality of nozzle blades disposed to vary a throat area of inducer assembly 280 in response to thermally induced growth of thermally mismatched rings with different coefficients of thermal expansion.

Figure 11:
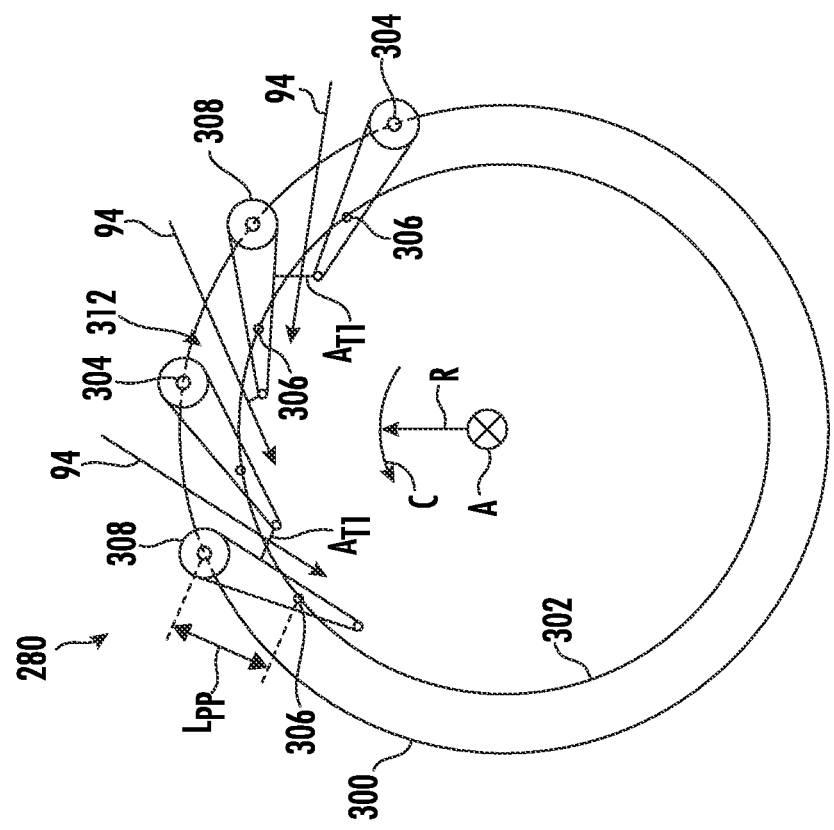
FIG. 11 is an enlarged cross-section view of the radial inducer assembly in a first position in accordance with an exemplary aspect of the present disclosure.

Referring now to FIG. 11, FIG. 11 provides an enlarged cross-section view of inducer assembly 280 in a first position in accordance with an exemplary aspect of the present disclosure.

Inducer assembly 280 includes a first ring 300 and a second ring 302. First ring 300 and second ring 302 are ring shaped discs (e.g., toroidal shaped, such as a rectangular toroid) of solid material.

It will be appreciated, however, that as used herein, the term "ring" is a term of convenience for generally describing a structure that extends around an axis. The term "ring" does not require a completely circular shape, and could refer to any structure that extends around an axis and is capable of performing the functions described herein.

In certain exemplary embodiments, first ring 300 includes a material with a first coefficient of thermal expansion. More specifically, in at least certain exemplary aspects, a material of first ring 100 may include a metal such as a nickel or nickel alloy. Additionally, or alternatively, the first coefficient of thermal expansion can be 5 microinches/(inch×deg. Fahrenheit) or greater (such as greater than or equal to 7 microinches/(inch×deg. Fahrenheit), such as less than or equal to 13 microinches/(inch×deg. Fahrenheit)).

Likewise, second ring 302 may include a material with a second coefficient of thermal expansion that is different than the first coefficient of thermal expansion. In certain exemplary embodiments, the second coefficient of thermal expansion of second ring 302 is less than the first coefficient of thermal expansion of first ring 300. More specifically, in at least certain exemplary aspects, a material of second ring 102 may include a non-metal material such as a ceramic matrix composite, such as a silicon carbide material. Additionally, or alternatively, the second coefficient of thermal expansion can be 5 microinches/(inch×deg. Fahrenheit) or less (such as less than or equal to 4 microinches/(inch×deg. Fahrenheit), such as less than or equal to 3 microinches/(inch×deg. Fahrenheit), such as greater than 0 microinches/(inch×deg. Fahrenheit)).

First ring 300 is configured to expand at a first rate in response to a change in thermal energy. Second ring 302 is configured to expand at a second rate in response to the same change in thermal energy. More specifically, in at least certain exemplary aspects, the first rate of first ring 300 is greater than the second rate of second ring 302.

In an exemplary embodiment, first ring 300 is mounted and attached to duct 84 of turbofan engine 12 such that first ring 300 is fixed tangentially relative to axial centerline 14. In another exemplary embodiment, second ring 302 is mounted to the plurality of nozzle blades 308 and is free to rotate tangentially relative to axial centerline 14 (and relative to first ring 300). Such a configuration will be described in more detail below with reference to FIGS. 14 through 17.

In certain exemplary embodiments, first ring 300 and second ring 302 may be disposed in and mounted to inner portions of duct 84 (see e.g., FIG. 10). Additionally, first ring 300 may be connected to a plurality of nozzle blades 308 via a plurality of first pins 304 and second ring 302 may be connected to the plurality of nozzle blades 308 via a plurality of second pins 306. In such a manner, the plurality of nozzle blades 308 may be rotatably coupled to first ring 300 and to second ring 302.

Inducer assembly 280 additionally includes first pins 304 and second pins 306. First pins 304 and second pins 306 are pegs or rods of, e.g., solid material configured to insert into corresponding receptacles or holes defined by first ring 300 and second ring 302, respectively. First pins 304 engage with corresponding holes defined by and located in first ring 300. Second pins 306 engage with corresponding holes define by and located in second ring 302. In an exemplary embodiment, with respect to an individual nozzle blade 308 of the plurality of nozzle blades 308, a first pin (of first pins 304) is disposed outward along the radial direction R and circumferentially offset along the circumferential direction C from a second pin (of second pins 306).

First pins 304 and second pins 306 define a distance Lpp. More specifically, distance Lpp is defined by the pair of one of first pins 304 and one of second pins 306 that are mounted to a particular one of nozzle blades 308. Distance Lpp can further be defined as a projected distance between a center of a one of first pins 304 that is mounted into a particular nozzle blade 308 and a center of a one of second pins 306 that is mounted into the particular nozzle blade 308. Distance Lpp may be determinative of how much nozzle blades 308 will rotate as first ring 300 outgrows second ring 302 in response to a transfer of thermal energy between air flow 94 and first ring 300 and between air flow 94 and second ring 302.

As noted above, inducer assembly 280 additionally includes nozzle blades 308. Nozzle blades 308 are louvers, paddles, or airfoils configured to direct a fluid flow. In certain exemplary embodiments, nozzle blades 308 are oriented in a tilted or canted position relative to radial direction R. Each of nozzle blades 308 are configured to rotate about one of first pins 304 and one of second pins 306. For example, as the transfer of thermal energy between air flow 94 and first ring 300 and between air flow 94 and second ring 302 occurs, each of nozzle blades 308 will rotate as first ring 300 grows (or contracts) faster than second ring 302. In this way, a second end of each nozzle blade 308 is rotatably engaged with second ring 302 via one of second pins 306.

Inducer assembly 280 defines passages 312. More specifically, in at least certain exemplary aspects, passages 312 are defined in-part by first ring 300, by second ring 302, and by nozzle blades 308.

Passages 312 define a first throat area $A_{T1}$ between adjacent nozzle blades 308. It should be understood that the term "first throat area $A_{T1}$" may refer to either a throat area of a singular passage 112 between two adjacent nozzle blades 308 and that the term "first throat area $A_{T1}$" also may refer to a total amount of area equivalent to a sum of all first throat areas $A_{T1}$ between every pair of adjacent nozzle blades 308 extending around a full 360° of inducer assembly 280. In certain exemplary embodiments, a size of first throat area $A_{T1}$ impacts or sets an amount, a rate, and/or a pressure of air flow 94 able to pass through passages 112.

In certain exemplary embodiments, distance Lpp can be tuned to provide desired rotational performance of nozzle blades 308 depending on throat area requirements for specific engines. For example, in adjusting distance Lpp, the change in first throat area $A_{T1}$ (see e.g., FIGS. 11 and 12) can be tuned to provide a decreased or an increased amount of air flow 94 to rotor blade 122 (see e.g., FIG. 10) of HP turbine 30.

During operation of propulsion system 10, as the temperature of air flow 94 is increased, a radial position of first pins 304 disposed in first ring 300 outgrows along radial direction R a radial position of second pins 306 disposed in second ring 302. As the radial position of first pins 304 outgrows the radial position of second pins 306, nozzle blades 308 rotate in a more open position. As nozzle blades 308 rotate open, each of first throat areas $A_{T1}$ increases allowing for a greater amount of air flow 94 to pass through passages 112 (see e.g., FIG. 12).

Figure 12:
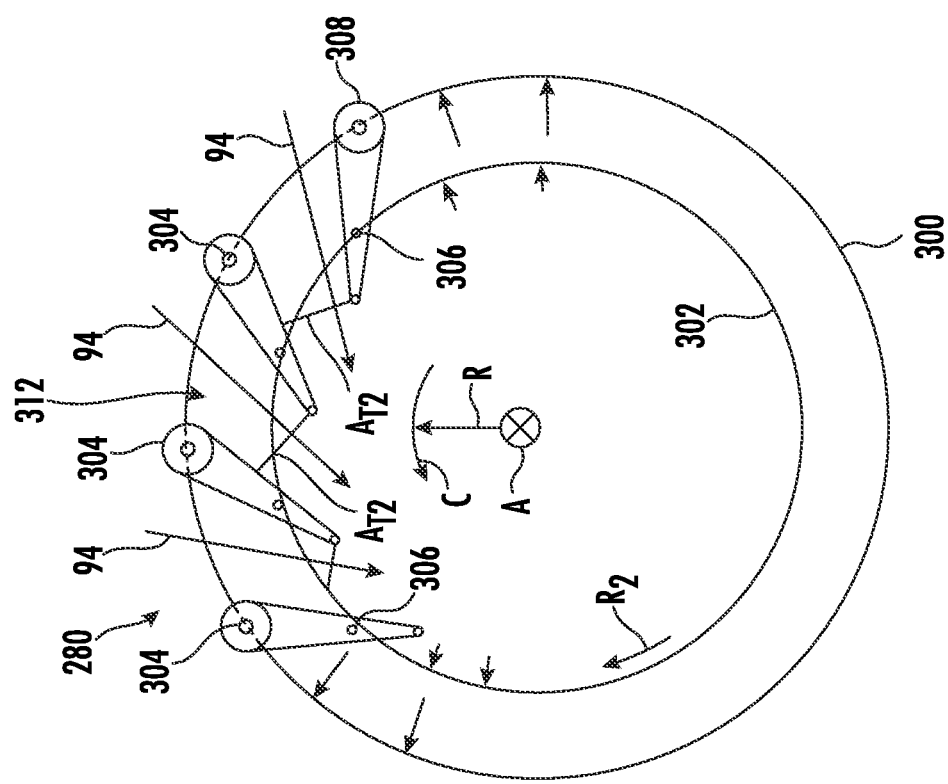
FIG. 12 is an enlarged cross-section view of the axial inducer assembly in a second position in accordance with an exemplary aspect of the present disclosure.

FIG. 12 is an enlarged cross-section view of inducer assembly 80 in a second position in accordance with an exemplary aspect of the present disclosure.

Here in FIG. 12, first ring 300 and second ring 302 are shown in a second position. More specifically, in at least certain exemplary aspects, each of nozzle blades 308 are shown as occupying a second rotational position different from a first rotational position shown in FIG. 11.

As shown in FIG. 12, adjacent nozzle blades 308 now define a second throat area $A_{T2}$ extending between adjacent nozzle blades 308. Second throat area $A_{T2}$ shown in FIG. 12 is greater than first throat area $A_{T1}$ shown in FIG. 11.

Also shown in FIG. 12 is a rotation $R_2$ of second ring 302. Rotation $R_2$ of second ring 302 occurs as first ring 300 and second ring 302 expand in response to absorbing thermal energy from air flow 94. In certain exemplary embodiments, rotation $R_2$ of second ring 302 occurs due to Lpp distance being a fixed value because of the fixed distance (e.g., a pin-to-pin distance) between first pin 304 and second pin 306 mounted to a particular nozzle blade 308. In order to maintain the pin-to-pin distance, nozzle blade 308 pulls second ring 302 in a tangential (or a circumferential direction) resulting in rotation of second ring 302 and an increase in throat area (e.g., increase in size from first throat area $A_{T1}$ to second throat area $A_{T2}$).

Figure 13:
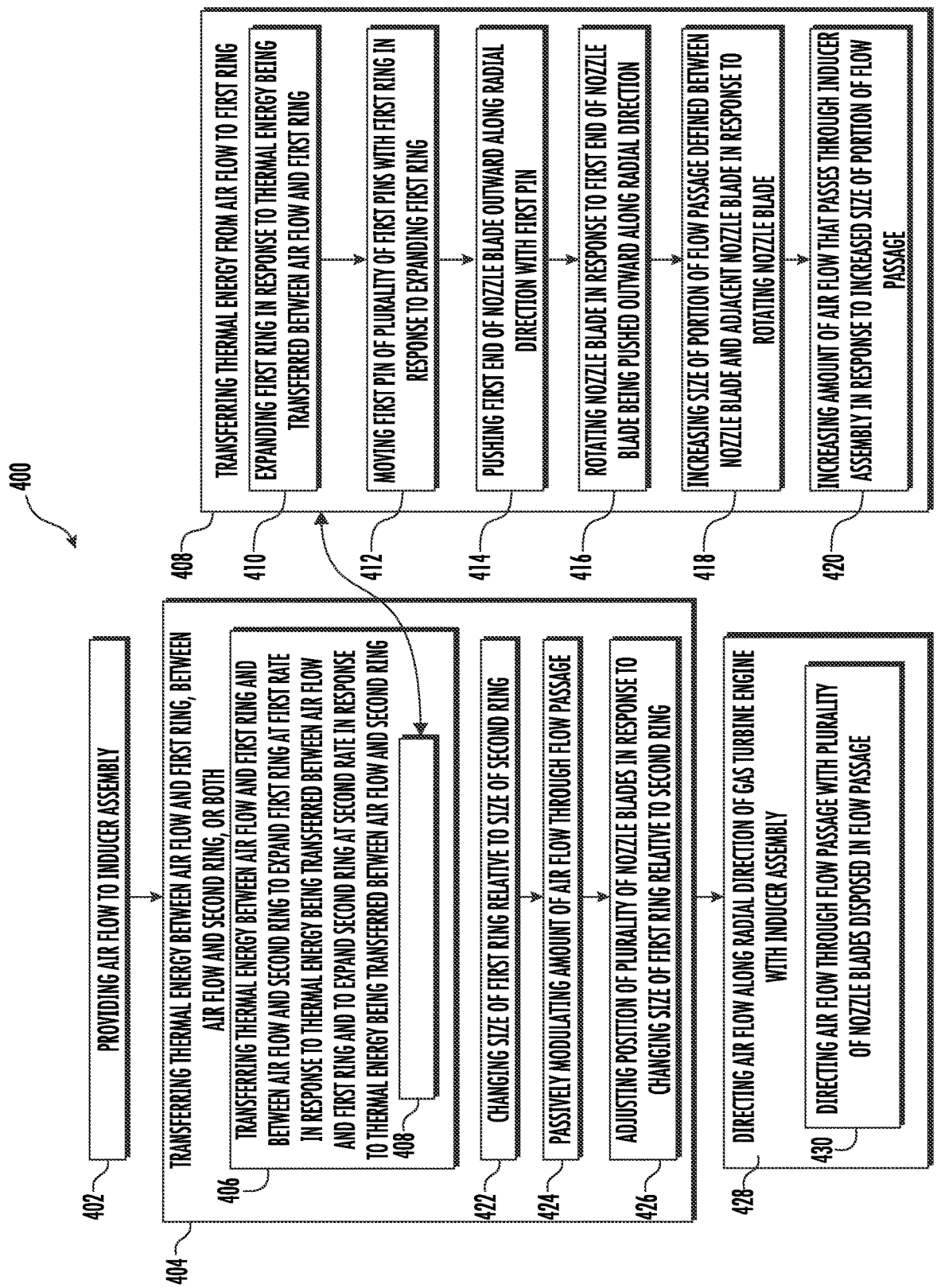
FIG. 13 is a flowchart of a method of modulating a flow of cooling air through the axial inducer assembly in accordance with an exemplary aspect of the present disclosure.

Referring now to FIG. 13, FIG. 13 is a flowchart of a method 400 of modulating a flow of cooling air through inducer assembly 280 in accordance with an exemplary aspect of the present disclosure.

Method 400 provides at 402 providing air flow 94 to inducer assembly 280. Method 400 provides at 404 transferring thermal energy between air flow 94 and first ring 300, between air flow 94 and second ring 302, or both. Step 404 of method 400 may provide at step 406 transferring thermal energy from air flow 94 to first ring 300.

Step 406 of method 400 may provide at step 408 expanding first ring 300 in response to thermal energy being transferred between air flow 94 and first ring 300. Step 406 of method 400 may provide at step 410 moving a first pin of a plurality of first pins with first ring 300 in response to expanding first ring 300, wherein the first pin of the plurality of first pins is connected to the first end of a nozzle blade 308 of the plurality of nozzle blades 308, wherein the second end of the nozzle blade 308 is rotatably engaged with second ring 302, wherein a portion of passage 312 is defined between the nozzle blade 308 and an adjacent nozzle blade 308. Step 406 of method 400 may provide at step 412 pushing the first end of the nozzle blade 308 outward along radial direction R with the first pin.

Step 406 of method 400 may provide at step 414 rotating the nozzle blade 308 in response to the first end of the nozzle blade 308 being pushed outward along radial direction R. Step 406 of method 400 may provide at step 416 increasing a size of the portion of passage 312 defined between the nozzle blade 308 and the adjacent nozzle blade 308 in response to rotating the nozzle blade 308. Step 406 of method 400 may provide at step 418 increasing an amount of air flow 94 that passes through inducer assembly 280 in response to the increased size of the portion of passage 312 defined between the nozzle blade 308 and the adjacent nozzle blade 308.

Step 404 of method 400 may provide at step 420 changing a size of first ring 300 relative to a size of second ring 302. Step 420 of method 400 may provide at step 422 transferring thermal energy between air flow 94 and first ring 300 and between air flow 94 and second ring 302 to expand first ring 300 at a first rate in response to thermal energy being transferred between air flow 94 and first ring 300 and to expand second ring 302 at a second rate in response to thermal energy being transferred between air flow 94 and second ring 302. In certain exemplary embodiments, the first rate of first ring 300 is greater than the second rate of second ring 302. Step 420 of method 400 may provide at step 424 adjusting a position of the plurality of nozzle blades 308 in response to changing the size of first ring 300 relative to second ring 302.

Step 404 of method 400 may provide at step 426 passively modulate an amount of air flow 94 through passage 312.

Method 400 provides at 428 directing air flow 94 along radial direction R of turbofan engine 12 with inducer assembly 280. Step 428 of method 400 may provide at step 430 directing air flow 94 through passage 312 with a plurality of nozzle blades 308 that are disposed in passage 312.

Referring now to FIG. 14, FIG. 14 is an isolated cross-section view of portion B from FIG. 10 of a first inducer assembly 80A in accordance with an exemplary aspect of the present disclosure. A first inducer assembly 280A of FIG. 14 may be configured in substantially the same manner as inducer assembly 280 of FIGS. 10 through 12. In addition to elements discussed above (e.g., with respect to FIGS. 10-12), first inducer assembly 280A also includes a cavity 314 defined by a portion of first ring 300 and a W-seal 316 disposed in cavity 314.

Here, FIG. 14 shows an exemplary arrangement and positioning of the components of first inducer assembly 280A. In certain exemplary embodiments, first ring 300 can define cavity 314 extending between a portion of first ring 300 and second ring 302.

W-seal 316 is disposed between a portion of first ring 300 and a portion of second ring 302 to prevent fluid flow across W-seal 316. More specifically, in at least certain exemplary aspects, W-seal 316 may prevent a fluid from flowing inward past an interface between first ring 300 and second ring 302. W-seal 316 more specifically forms a sliding seal between the portion of first ring 300 defining cavity 314 and second ring 302. Accordingly, it will be appreciated that in other embodiments, W-seal 316 may be any other suitable sliding seal.

Moreover, it will be appreciated that, although not depicted, each of the plurality of nozzle blades 308 may include an endwall seal of a forward endwall, an aft endwall, or both. The endwall seal may include a groove in the forward and/or aft endwall with, e.g., a pressure loaded member (such as a piston bar), therein. The pressure loaded member may contact, e.g., the first and/or second ring 300, 302, or the duct 84. In such a manner, the nozzle blades 308 may prevent or reduce an airflow bypassing the nozzle blades 308.

In an exemplary embodiment, FIG. 14 provides an example where air flow 94 may include a flow of air from a single air source or may include a mixed flow of air (e.g., a mixture of air from the compressor section and from CCA system 72).

As discussed above, as thermal energy is transferred from air flow 94 to first ring 300 and second ring 302, first ring 300 and second ring 302 thermally expand and grow outward along radial direction R. However, due to the mismatch in coefficients of thermal expansion between the materials of first ring 300 and second ring 302, first ring 300 grow/expands at a faster rate than second ring 302. In response to first ring 300 growing/expanding, first ring 300 pushes first pin 304 in an outward along radial direction R. Likewise, in response to second ring 302 growing/expanding, second pin 306 is pushed outward along radial direction R, albeit at a slower rate than first pin 304 is being pushed. Due to this radial translation rate mismatch between first pin 304 and second pin 306, nozzle blade 308 rotates about both of first pin 304 and second pin 306. As nozzle blade 308 rotates about first pin 304 and second pin 306, a throat area between adjacent nozzles increases thereby allowing more air flow 94 to move through the opening (e.g., passages 112) between adjacent nozzle blades 308.

Referring now to FIG. 15, FIG. 15 is an enlarged cross-section view of a portion of turbofan engine 12 and shows a flow divider 320 upstream from second inducer assembly 280B in accordance with an exemplary aspect of the present disclosure. The embodiment provided in FIG. 15 may be configured in substantially the same manner as described in regard to FIG. 14, with the addition of flow divider 320.

Flow divider 320 is a curved piece of, e.g., solid material. In certain exemplary embodiments, flow divider 320 can extend partially or a full 360° about axial centerline 14 (see e.g., FIG. 1). Flow divider 320 is disposed in duct 84 and may be mounted to either duct 84 or to a portion of frame assembly 85 (see e.g., FIGS. 9-10).

In certain exemplary embodiments, flow divider 320 is disposed to create a temperature profile upstream of second inducer assembly 280B. More specifically, in at least certain exemplary aspects, flow divider 320 is disposed to separate or prevent (substantial) mixing of a first air flow 94A and a second air flow 94B before first air flow 94A and second air flow 94B reach first ring 300 and second ring 302.

In certain exemplary embodiments, first air flow 94A may include air from the compressor section of turbofan engine 12 while second air flow may include air from a heat exchanger such as from CCA system 72 (see e.g., FIG. 1).

First air flow 94A includes a first temperature and second air flow 94B includes a second temperature. During certain operational modes of propulsion system 10, the first temperature of first air flow 94A may be higher than the second temperature of second air flow 94B. Likewise, a differential between the first temperature of first air flow 94A and the second temperature of second air flow 94B can be at different magnitudes and at different rates of change during the different operational modes, and during the transitions therebetween, of propulsion system 10.

In an exemplary embodiment, with first air flow 94A including a higher temperature than second air flow 94B, flow divider 320 would guide the higher temperature first air flow 94A to and across first ring 300 of second inducer assembly 280B before first air flow 94A and second air flow 94B mix together to form a cooler combined flow. Put another way, the hotter first air flow 94A would preferentially come into contact with first ring 300 before a mixture of first air flow 94A and second air flow 94B come into contract with second ring 302.

In another exemplary embodiment, second inducer assembly may be configured such that second ring 302 is disposed on an opposite side along axial direction A of nozzle blade 308 than first ring 300. In such an exemplary embodiment, with first air flow 94A including a higher temperature than second air flow 94B, flow divider 320 would guide the higher temperature first air flow 94A to and across first ring 300 of second inducer assembly 280B and flow divider 320 would guide the lower temperature second air flow 94B to and across second ring 302. Put another way, the hotter first air flow 94A would preferentially come into contact with first ring 300 while the cooler second air flow 94B would come into contract with second ring 302.

In this way, the growth rate differential between first ring 300 and second ring 302 would be amplified in that first ring 300 already has a higher coefficient of thermal expansion than second ring 302 and so first ring 300 already grows at a faster rate than second ring 302 when exposed to the same amount of thermal energy transfer. Here, with first ring 300 being exposed to a higher temperature air flow (e.g., first air flow 94A), first ring 300 will grow at a faster rate than second ring 302 due to both the higher amount of thermal energy being transfer to first ring 300 and the larger coefficient of thermal expansion and the corresponding faster thermal growth rate of first ring 300 over second ring 302.

Referring now to FIG. 16, FIG. 16 is an isolated cross-section view of a third inducer assembly 280C in accordance with an exemplary aspect of the present disclosure. The embodiment provided in FIG. 16 may be configured in substantially the same manner as described in regard to FIG. 14, with the addition of an insulation 324.

As shown in FIG. 16, third inducer assembly 280C includes insulation 324. Insulation 324 is a layer or sheet of insulation configured to minimize a transfer of thermal energy thereacross. In certain exemplary embodiments, insulation 324 may include a layer of honeycomb shaped material such as metal (e.g., sheet metal capped honeycomb or a sheet-ring of metal material with a honeycomb configuration). However, in other exemplary embodiments, insulation 324 may instead be any other suitable material with a higher thermal resistance than, e.g., the material forming duct 84.

In this exemplary embodiment, insulation 324 is disposed between a sidewall of duct 84 and nozzle blade 308. First pin 304 and second pin 306 may pass through insulation 324 in order to engage with the sidewall of duct 84.

During operation, insulation 324 insulates the sidewall of duct 84 from thermal energy transfer from air flow 94. This insulative functionality of insulation 324 can change (e.g., speed up or slow) the thermal expansion of duct 84, first ring 300, and/or second ring 302 by reducing a transfer of thermal energy from air flow 94 that would have otherwise been transferred to duct 84. In this way, a rate of opening up passages of third inducer assembly can be dampened or amplified based on the design intent and desired performance characteristics of third inducer assembly 280C.

Referring now to FIG. 17, FIG. 17 is an isolated cross-section view of a fourth inducer assembly 280D in accordance with an exemplary aspect of the present disclosure. The embodiment provided in FIG. 17 may be configured in substantially the same manner as described in regard to FIG. 16, with an alternative positioning of insulation 324.

As shown in FIG. 17, insulation is positioned on an outer sidewall of duct 84 (in comparison to FIG. 16 showing insulation 324 being positioned along an inner sidewall of duct 84).

In such an exemplary embodiment, sidewall of duct 84 is insulated by insulation 324 from air external to duct 84. More specifically, in at least certain exemplary aspects, the exterior of duct 84 may be exposed to air from the compressor section (e.g., air from a seal cavity downstream from a source of compressor discharge pressure). Insulation 324 insulates sidewall of duct 84 from the air from the compressor section by preventing the air from coming into contact with the sidewall of duct 84. In this way, the amount of thermal energy transferred from the air external to duct 84 is decreased (relative to an exemplary embodiment without insulation 324). This decreased rate of transfer of thermal energy to duct 84 will change the rate at which first pins 304 and second pins 306 move outward along radial direction R and thereby altering the rate of change that the passages (e.g., passages 112/312) formed between adjacent nozzle blades 308 are opened.

Insulation 324 is, for the embodiment shown, engaged with a surface of duct 84. It will be appreciated, however, that in other exemplary embodiments, insulation may be disposed on either side-face of either first ring 300 or second ring 302.

It will be appreciated that in other exemplary embodiments, a passive flow modulation device of the present disclosure, such as one or more of the inducer assemblies 280 of the present disclosure, may be configured in any other suitable manner. For example, instead of being configured to increase a size of the passage(s) (such as passages 312) to allow for the air flow therethrough in response an increase in temperature of the air flow therethrough, the passive flow modulation device may be configured to decrease the size of the passage(s) (such as passages 312) to allow for the air flow therethrough in response an increase in temperature of the air flow therethrough. For example, with such a configuration, a first pin 304 rotatably coupled proximate to a first end of a nozzle blade 308 (which may be an air flow inlet end) may be coupled to a second ring 302, whereas a second pin 306 rotatably coupled proximate to a second end of the nozzle blade 308 (which may be an air flow outlet end) may be coupled to a first ring 300. The second ring 302 may be formed of a material having a coefficient of thermal expansion greater than a coefficient of thermal expansion of a material forming the first ring 300. In such a manner, an increase in temperature of the air flow through the passage(s) may cause the second ring 302 to expand relative to the first ring 300 and reduce a size of the passage(s). Such a configuration may be useful, e.g., when the passive flow modulation device is a passive valve in a bleed duct that needs to be shut down as a power of the engine increases and a temperature of the bleed airflow increases.

Figure 18:
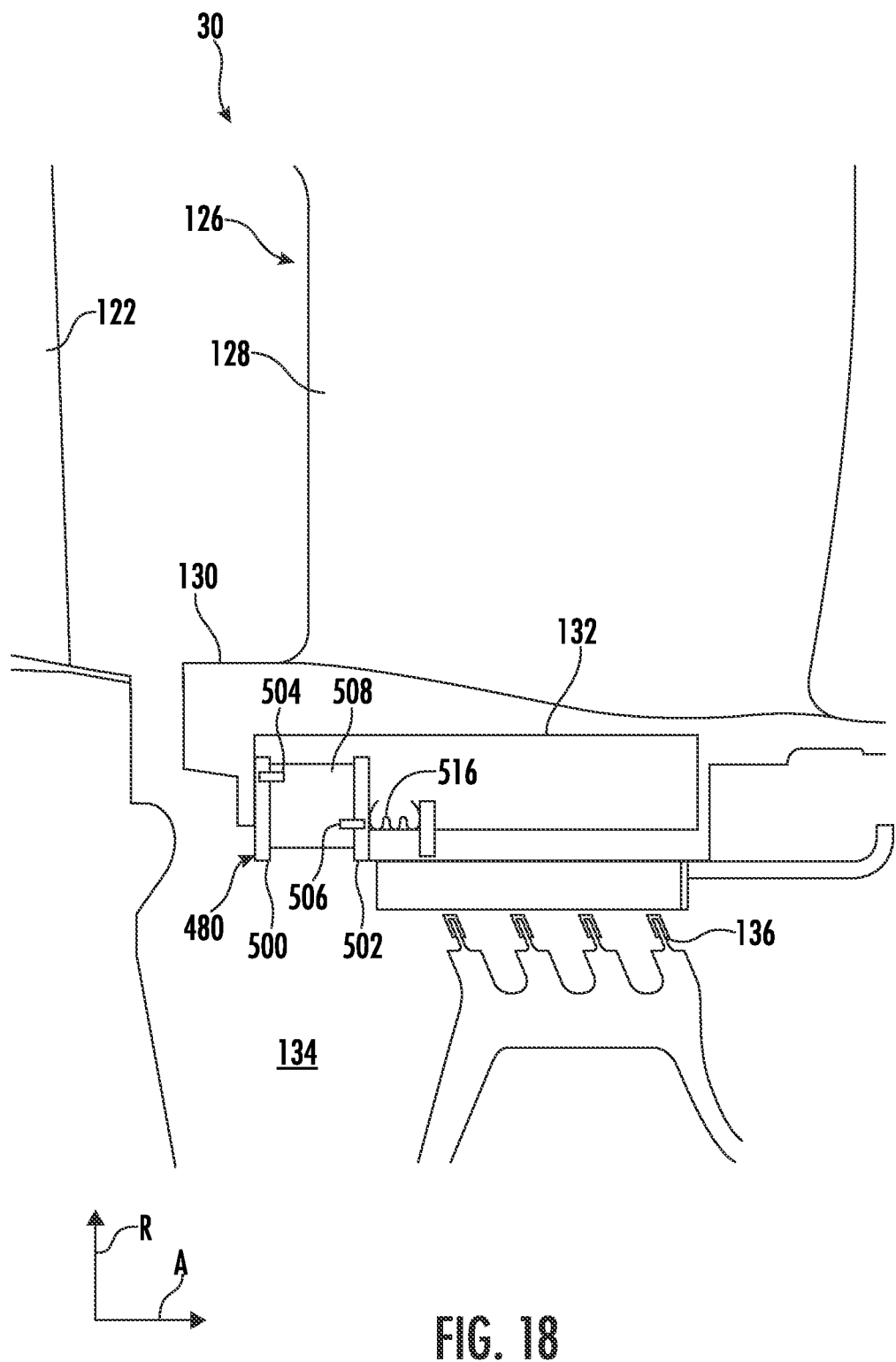
FIG. 18 is an enlarged cross-section view of a portion of a turbine section of the gas turbine engine and shows an inducer assembly in accordance with an exemplary aspect of the present disclosure.

Referring now to FIG. 18, FIG. 18 is an enlarged cross-section view of a portion of HP turbine 30 of turbofan engine 12 (see, e.g., FIG. 2) and shows an inducer assembly 480 in accordance with an exemplary aspect of the present disclosure.

As show in FIG. 18, HP turbine 30 includes rotor blade 122 and a stator 126. Stator 126 is a stationary component (e.g., a second stage stator) of turbomachine 18 that is mounted to a non-rotating component of turbofan engine 12.

Stator 126 includes a stator blade 128. Stator blade 128 is an airfoil portion of stator 126. Stator 126 also includes a hub 130. Hub 130 is a base or platform of stator 126 and is connected to an inward along radial direction R end of stator blade 128. It should be appreciated that hub 130 can extend circumferentially and 360° about axial centerline 14 of propulsion system 10 (see e.g., FIG. 1). Hub 130 of stator 126 defines a cavity 132. Cavity 132 is a pocket or void formed within hub 130. In an exemplary embodiment, cavity 132 and the surrounding portions of hub 130 defining cavity 132 may be referred to as a hub-box or a nozzle hub-box.

Turbofan engine 12 defines a cavity 134. Cavity 134 is disposed inward along radial direction R from hub 130 and is defined in part by a seal 136. In an exemplary embodiment, cavity 134 may be an aft cavity of a first stage rotor of HP turbine 30. Cavity 134 is in fluid communication with cavity 132 via passages defined by and through inducer assembly 480. Seal 136 is a fluidic seal such as a labyrinth seal. Seal 136 is disposed along an inward along radial direction R surface of hub 130. With hub 130 being a stationary component of turbofan engine 12, seal 136 forms a sealing interface with a corresponding rotating component of turbofan engine 12.

Similar to inducer assemblies discussed above (e.g., inducer assembly 280), inducer assembly 480 includes a first ring 500 with a first coefficient of thermal expansion. Inducer assembly 480 also includes a second ring 502 with a second coefficient of thermal expansion. Inducer assembly 480 additionally includes a first pin 504 and a second pin 506. First pin 504 extends between and connects to first ring 500 and to a nozzle blade 508. Second pin 506 connected to and extends between second ring 502 and nozzle blade 508.

Inducer assembly 480 further includes nozzle blade 508. As described above with respect to nozzle blade 308, nozzle blade 508 is a louver, a paddle, or an airfoil configured to direct a fluid flow. In certain exemplary embodiments, inducer assembly 480 may include a plurality of nozzle blades 508 distributed circumferentially about axial centerline 14 of turbofan engine 12.

In this exemplary embodiment, inducer assembly 480 includes a W-seal 516 and an insulation 524 (see FIG. 19). W-seal 516 disposed to form a sealing interface between second ring 502 and a portion of hub 130.

Referring now to FIG. 19, FIG. 19 is an isolated cross-section view of inducer assembly 480 of FIG. 18 in accordance with an exemplary aspect of the present disclosure.

As show here, hub 130 may include a seal 131. In this exemplary embodiment, seal 131 is connected to and disposed to form a fluidic seal between a portion of hub 130 and first ring 500.

In this exemplary embodiment, inducer assembly 480 further includes an insulation 524. Similar to insulation 324 discussed with respect to FIGS. 16 and 17, insulation 524 can be disposed to insulate first ring 500 (and or second ring 502) from air flow 94 passing across first ring 500 through inducer assembly 480 or from air passing across a side-face of first ring 500 disposed on an opposite side of first ring 500 from nozzle blade 508.

In an exemplary embodiment, during operation, air (e.g., HP turbine aft cavity air) passing to or from cavity 134 comes into contact with first ring 500. As a temperature of the air contacting first ring 500 transfers thermal energy to first ring 500, first ring 500 expands thereby pushing first pin 504 in an outward along radial direction R.

In response to first pin 504 being pushed outward (and at a faster rate than second pin 506 due to the thermal mismatch between the first coefficient of thermal expansion of first ring 500 and the second coefficient of thermal expansion of second ring 502), nozzle blade 508 rotates thereby increasing the size of the throat area between adjacent nozzle blades. In response to the nozzle blades increasing the size of the throat area, a rate of air flow 94 passing through inducer assembly 480 increases resulting in an increased amount of air flow 94 diverted into cavity 134.

In certain exemplary embodiments, holes (e.g., forward dump holes) disposed in a hub box of a nozzle can be replaced with the disclosed embodiment of inducer assembly 480 thereby minimizing ingestion from the upstream cavity (e.g., cavity 134). If a temperature of the air in cavity 134 increases, a temperature of first ring 500 will also increase, resulting in the throat area of inducer assembly 480 to increase and causing more air flow 94 to be delivered to cavity 134. In this way, inducer assembly 480 can acts as a flow modulation device and a safety mechanism for hub 130 (e.g., for the hub box) of stator 126.

As provided herein, the disclosed inducer assemblies are discussed with respect to a turbofan engine. It should be appreciated, however, that turbofan engine 12 depicted in FIG. 1 is by way of example only, and that in other exemplary embodiments, aspects of the present disclosure may additionally, or alternatively, be applied to any other suitable gas turbine engine or industrial engine.

It will be appreciated that although the passive flow modulation device is described in terms of an inducer assembly (e.g., an axial inducer assembly or radial inducer assembly) herein, in other exemplary embodiments the passive flow modulation device may be configured for use as any other suitable flow modulation device. For example, in other embodiments, the passive flow modulation device may be configured in a similar manner as one or more of the exemplary inducer assemblies of FIGS. 3 through 6, but the threadings may not have a helical shape, and instead may define a linear shape. In such a manner, it will further be appreciated that the passive flow modulation device may be used in other applications and with other systems of the gas turbine engine. For example, in other exemplary embodiments, the passive flow modulation device may be used upstream within the CCA system (upstream of a separate inducer assembly), within an ACC system, etc.

Further, it will be appreciated that although the passive flow modulation device is described in terms of use within turbofan engine 12, in other exemplary embodiments, the passive flow modulation device may be used within any other suitable aeronautical gas turbine engine (e.g., turboprop, turbojet, turboshaft, etc.), or further within any non-aeronautical gas turbine engine, such as a nautical gas turbine engine, a gas turbine engine for power generation (an industrial gas turbine engine), etc.

Further, still, it will be appreciated that in still other exemplary embodiments, certain embodiments of the passive flow modulation device may be used in any other suitable machine, and is not limited to gas turbine engines. For example, embodiments of the passive flow modulation device may be used in other combustion engines, elsewhere in vehicles, etc.

Moreover, it will be appreciated that in still other exemplary embodiments, the arrangement of the second ring inward of the first ring may be reversed, such that increasing a temperature of the first and second rings decreases a flow area. For example, if used as a valve incorporated into, e.g., a duct, where an increase in the airflow temperature indicated a need to reduce an amount of airflow that would be needed through the flow area, arranging the ring with the higher coefficient of thermal expansion inward of the ring with the lower coefficient of thermal expansion may accomplish such a goal.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A passive flow modulation device for a machine defining an axial direction and a radial direction, the passive flow modulation device comprising: a first ring with a first coefficient of thermal expansion; a second ring disposed coaxially with the first ring and positioned at least partially inward of the first ring along the radial direction, spaced from the first ring along the axial direction, or both, the first ring, the second ring, or both defining at least in part one or more passages, the second ring with a second coefficient of thermal expansion that is less than the first coefficient of thermal expansion to passively modulate a size of the one or more passages during operation.

The passive flow modulation device of one or more of these clauses, wherein the machine is a gas turbine engine defining the radial direction, and wherein the second ring is positioned inward of the first ring along the radial direction.

The passive flow modulation device of one or more of these clauses, wherein the gas turbine engine further defines the axial direction, wherein the one or more passages are configured to direct an air flow through the one or more passages in the axial direction.

The passive flow modulation device of one or more of these clauses, further comprising a seal, wherein the gas turbine engine comprises a frame assembly, wherein the first ring is configured to be moveably coupled to the frame assembly such that the first ring is moveable along the radial direction relative to the frame assembly, and wherein the seal is configured to form an air flow seal between the frame assembly and the first ring.

The passive flow modulation device of one or more of these clauses, wherein the seal is a first seal, and wherein the passive flow modulation device further comprises a second seal, wherein the second ring is configured to be coupled to the frame assembly such that the second ring is moveable along the radial direction relative to the frame assembly, and wherein the second seal is configured to form an air flow seal between the frame assembly and the second ring.

The passive flow modulation device of one or more of these clauses, wherein the gas turbine engine comprises a turbomachine having a turbine, and wherein the passive flow modulation device is an inducer for directing and passively modulating a cooling air flow to the turbine of the turbomachine.

The passive flow modulation device of one or more of these clauses, wherein the first ring comprises a first threading disposed along an inner surface along the radial direction, wherein the second ring comprises a second threading disposed along an outer surface along the radial direction, wherein the first threading of the first ring is engaged with the second threading of the second ring, and wherein the first threading and the second threading define at least in part the one or more passages.

The passive flow modulation device of one or more of these clauses, wherein the machine is a gas turbine engine defining the axial direction, wherein the first ring is spaced from the second ring along the axial direction, and wherein passive flow modulation device further comprises: a plurality of nozzle blades disposed between and connected to the first ring and the second ring, wherein the one or more passages are further defined at least in part by the plurality of nozzle blades.

The passive flow modulation device of one or more of these clauses, wherein each nozzle blade of the plurality of nozzle blades is connected to one of the first ring or second ring at a first end of the nozzle blade with a first pin, wherein each nozzle blade is connected to the other of the first ring or second ring at a second end of the nozzle blade with a second pin, wherein the first pin is disposed outward along the radial direction and circumferentially offset from the second pin.

The passive flow modulation device of one or more of these clauses, each pair of adjacent nozzle blades defines a throat area, and wherein second coefficient of thermal expansion is less than the first coefficient of thermal expansion to modulate a size of the throat area of each pair of adjacent air flow blades.

The passive flow modulation device of one or more of these clauses, wherein the gas turbine engine comprises a turbomachine having a turbine, and wherein the passive flow modulation device is an inducer for directing and passively modulating a cooling air flow to the turbine of the turbomachine.

A method of providing an air flow in a gas turbine engine, the gas turbine engine defining an axial centerline, the method comprising: providing the air flow to an inducer assembly, the inducer assembly comprising: a first ring with a first coefficient of thermal expansion; and a second ring disposed coaxially with the first ring, the second ring with a second coefficient of thermal expansion that is less than the first coefficient of thermal expansion of the first ring, wherein a flow passage is defined at least in part between the first ring and the second ring, wherein the flow passage comprises a flow area between the first ring and the second ring; transferring thermal energy between the air flow and the first ring, between the air flow and the second ring, or both to change a size of the first ring relative to a size of the second ring and passively modulate an amount of the air flow through the flow passage.

The method of one or more of these clauses, wherein transferring thermal energy between the air flow and the first ring, between the air flow and the second ring, or both to change a size of the first ring relative to a size of the second ring comprises transferring thermal energy between the air flow and the first ring and between the air flow and the second ring to expand the first ring at a first rate in response to thermal energy being transferred between the air flow and the first ring and to expand the second ring at a second rate in response to thermal energy being transferred between the air flow and the second ring, wherein the first rate of the first ring is greater than the second rate of the second ring.

The method of one or more of these clauses, further comprising directing, with the inducer assembly, the air flow along an axial direction of the gas turbine engine, wherein the second ring is disposed inside of the first ring.

The method of one or more of these clauses, wherein the gas turbine engine defines a radial direction, and wherein the method further comprises: directing, with the inducer assembly, the air flow along the radial direction of the gas turbine engine.

The method of one or more of these clauses, wherein directing, with the inducer assembly, the air flow along the radial direction of the gas turbine engine comprises directing the air flow through the flow passage with a plurality of nozzle blades disposed in the flow passage.

The method of one or more of these clauses, wherein transferring thermal energy between the air flow and the first ring, between the air flow and the second ring, or both to change a size of the first ring relative to a size of the second ring comprises adjusting a position of the plurality of nozzle blades in response to changing the size of the first ring relative to the second ring.

The method of one or more of these clauses, wherein transferring thermal energy between the air flow and the first ring, between the air flow and the second ring, or both comprises transferring thermal energy from the air flow to the first ring, wherein each nozzle blade of the plurality of nozzle blades includes a first end and a second end, the method further comprising: expanding the first ring in response to thermal energy being transferred between the air flow and the first ring; moving, with the first ring, a first pin of a plurality of first pins in response to expanding the first ring, wherein the first pin of the plurality of first pins is connected to the first end of a nozzle blade of the plurality of nozzle blades, wherein the second end of the nozzle blade is rotatably engaged with the second ring, wherein a portion of the flow passage is defined between the nozzle blade and an adjacent nozzle blade; pushing, with the first pin, the first end of the nozzle blade outward along the radial direction; rotating the nozzle blade in response to the first end of the nozzle blade being pushed outward along the radial direction; increasing a size of the portion of the flow passage defined between the nozzle blade and the adjacent nozzle blade in response to rotating the nozzle blade; and increasing an amount of the air flow that passes through the inducer assembly in response to the increased size of the portion of the flow passage defined between the nozzle blade and the adjacent nozzle blade.

A gas turbine engine, the gas turbine engine comprising: a turbomachine having a compressor section, a combustion section, and a turbine section arranged in serial flow order; and an inducer assembly in fluid communication with the turbine section, the inducer assembly comprising: a first ring with a first coefficient of thermal expansion; a second ring disposed coaxially with the first ring and spaced from the first ring to define at least in part one or more passages therebetween, the second ring with a second coefficient of thermal expansion that is less than the first coefficient of thermal expansion to passively modulate a size of the one or more passages during operation.

The gas turbine engine of one or more of these clauses, further comprising a source of cooling air in fluid communication with the inducer assembly, wherein the inducer assembly is configured to supply a flow of cooling air to the turbine section of the turbomachine.

We claim:

1. A passive flow modulation device for a machine defining an axial direction and a radial direction, the passive flow modulation device comprising:
   a first ring with a first coefficient of thermal expansion;
   a second ring disposed coaxially with the first ring and positioned at least partially inward of the first ring along the radial direction, spaced from the first ring along the axial direction, or both, the first ring, the second ring, or both defining at least in part one or more passages defining a helical shape, the second ring with a second coefficient of thermal expansion that is less than the first coefficient of thermal expansion to passively modulate a size of the one or more passages during operation, and wherein at least one of the first and second rings is configured to change size radially in at least one of an inward or outward direction.

2. The passive flow modulation device of claim 1, wherein the machine is a gas turbine engine defining the radial direction, and wherein the second ring is positioned inward of the first ring along the radial direction.

3. The passive flow modulation device of claim 2, wherein the gas turbine engine further defines the axial direction, wherein the one or more passages are configured to direct an air flow through the one or more passages in the axial direction.

4. The passive flow modulation device of claim 2, further comprising a seal, wherein the gas turbine engine comprises a frame assembly, wherein the first ring is configured to be moveably coupled to the frame assembly such that the first ring is moveable along the radial direction relative to the frame assembly, and wherein the seal is configured to form an air flow seal between the frame assembly and the first ring.

5. The passive flow modulation device of claim 4, wherein the seal is a first seal, and wherein the passive flow modulation device further comprises a second seal, wherein the second ring is configured to be coupled to the frame assembly such that the second ring is moveable along the radial direction relative to the frame assembly, and wherein the second seal is configured to form an air flow seal between the frame assembly and the second ring.

6. The passive flow modulation device of claim 2, wherein the gas turbine engine comprises a turbomachine having a turbine, and wherein the passive flow modulation device is an inducer for directing and passively modulating a cooling air flow to the turbine of the turbomachine.

7. The passive flow modulation device of claim 1, wherein the first ring comprises a first threading disposed along an inner surface along the radial direction, wherein the second ring comprises a second threading disposed along an outer surface along the radial direction, wherein the first threading of the first ring is engaged with the second threading of the second ring, and wherein the first threading and the second threading define at least in part the one or more passages.

8. The passive flow modulation device of claim 1, further comprising a flow divider, wherein the flow divider is configured to create a temperature profile upstream of the first ring and the second ring.

9. A method of providing an air flow in a gas turbine engine, the gas turbine engine defining an axial centerline, the method comprising:
providing the air flow to an inducer assembly, the inducer assembly comprising:
a first ring with a first coefficient of thermal expansion; and
a second ring disposed coaxially with the first ring, the second ring with a second coefficient of thermal expansion that is less than the first coefficient of thermal expansion of the first ring,
wherein a flow passage is defined at least in part between the first ring and the second ring, wherein the flow passage comprises a flow area between the first ring and the second ring, and wherein the flow passage defines a helical shape;
transferring thermal energy between the air flow and the first ring, between the air flow and the second ring, or both to change a size of the first ring relative to a size of the second ring and passively modulate an amount of the air flow through the flow passage; and
directing, with the inducer assembly, the air flow along an axial direction of the gas turbine engine, wherein the second ring is disposed inside of the first ring.

10. The method of claim 9, wherein transferring thermal energy between the air flow and the first ring, between the air flow and the second ring, or both to change a size of the first ring relative to a size of the second ring comprises transferring thermal energy between the air flow and the first ring and between the air flow and the second ring to expand the first ring at a first rate in response to thermal energy being transferred between the air flow and the first ring and to expand the second ring at a second rate in response to thermal energy being transferred between the air flow and the second ring, wherein the first rate of the first ring is greater than the second rate of the second ring.

11. A gas turbine engine, the gas turbine engine comprising:
a turbomachine having a compressor section, a combustion section, and a turbine section arranged in serial flow order; and
an inducer assembly in fluid communication with the turbine section, the inducer assembly comprising:
a first ring with a first coefficient of thermal expansion;
a second ring disposed coaxially with the first ring and spaced from the first ring to define at least in part one or more passages defining a helical shape therebetween, the second ring with a second coefficient of thermal expansion that is less than the first coefficient of thermal expansion to passively modulate a size of the one or more passages during operation; and
a flow divider, wherein the flow divider is configured to create a temperature profile upstream of the first ring and the second ring.

12. The gas turbine engine of claim 11, further comprising a source of cooling air in fluid communication with the inducer assembly, wherein the inducer assembly is configured to supply a flow of cooling air to the turbine section of the turbomachine.

* * * * *